(12) United States Patent
Zwilling et al.

(10) Patent No.: US 10,430,298 B2
(45) Date of Patent: Oct. 1, 2019

(54) VERSATILE IN-MEMORY DATABASE RECOVERY USING LOGICAL LOG RECORDS

(75) Inventors: Mike Zwilling, Redmond, WA (US); Per-Ake Larson, Redmond, WA (US); Cristian Diaconu, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 472 days.

(21) Appl. No.: 12/914,753

(22) Filed: Oct. 28, 2010

(65) Prior Publication Data

US 2012/0109895 A1    May 3, 2012

(51) Int. Cl.
G06F 16/20    (2019.01)
G06F 11/14    (2006.01)
G06F 16/23    (2019.01)

(52) U.S. Cl.
CPC ...... *G06F 11/1471* (2013.01); *G06F 16/2308* (2019.01); *G06F 16/2358* (2019.01); *G06F 2201/80* (2013.01)

(58) Field of Classification Search
CPC .............................. G06F 11/1471; G06F 16/20
USPC ......................................................... 707/648
See application file for complete search history.

(56) References Cited

U.S. PATENT DOCUMENTS

| | | | | |
|---|---|---|---|---|
| 5,278,982 | A * | 1/1994 | Daniels ............... | G06F 11/1471 |
| 5,469,562 | A * | 11/1995 | Saether ........................... | 714/20 |
| 5,524,205 | A * | 6/1996 | Lomet et al. ..................... | 714/16 |
| 5,692,121 | A * | 11/1997 | Bozso ................. | G06F 11/1641 |
| | | | | 714/10 |
| 5,907,848 | A * | 5/1999 | Zaiken ................... | G06Q 40/02 |
| 5,983,361 | A * | 11/1999 | Lee ...................... | G06F 11/1471 |
| | | | | 714/19 |
| 6,321,234 | B1 * | 11/2001 | Debrunner | |

(Continued)

FOREIGN PATENT DOCUMENTS

CN    101699439 A    4/2010

OTHER PUBLICATIONS

"Monitor and Estimate Logical Log Usage in Informix Dynamic Server," Jianing Fan, Nov. 18, 2003.*

(Continued)

*Primary Examiner* — Belix M Ortiz Ditren
(74) *Attorney, Agent, or Firm* — Wade IP Law LLC

(57) ABSTRACT

The subject disclosure relates to a database recovery technique that implements various aspects of transaction logging to optimize database recovery performance. Transactions are logged logically with no reference to physical location, which enables logging to be performed via multiple independent log streams in parallel. A set of log streams can further be adjusted to conform to a local configuration of a mirror or secondary node in order to increase mirroring flexibility. Additionally, individual transactions or groups of transactions are recorded using a single log record, which contains timestamp information to enable database recovery without reference to physical checkpoint files. Further, techniques are provided herein for processing transactions without Write Ahead Logging or hardening of undo information. As further described herein, a transaction can be committed via a set of hierarchical stages, which in turn can facilitate integration of an in-memory database system with one or more external database systems.

20 Claims, 16 Drawing Sheets

(56) References Cited

U.S. PATENT DOCUMENTS

| | | | | |
|---|---|---|---|---|
| 6,735,636 | B1* | 5/2004 | Mokryn et al. | 710/5 |
| 6,856,993 | B1* | 2/2005 | Verma et al. | |
| 8,001,094 | B2* | 8/2011 | Machida | G06F 11/3419 |
| | | | | 707/694 |
| 8,127,174 | B1* | 2/2012 | Shah et al. | 714/13 |
| 8,392,482 | B1* | 3/2013 | McAlister et al. | 707/899 |
| 2002/0007363 | A1* | 1/2002 | Vaitzblit | G06F 11/1471 |
| 2003/0002474 | A1* | 1/2003 | Alexander | H03M 9/00 |
| | | | | 370/351 |
| 2003/0061537 | A1 | 3/2003 | Cha et al. | |
| 2005/0021745 | A1* | 1/2005 | Bookman et al. | 709/224 |
| 2006/0218206 | A1* | 9/2006 | Bourbonnais et al. | 707/202 |
| 2007/0185852 | A1 | 8/2007 | Erofeev | |
| 2007/0185938 | A1* | 8/2007 | Prahlad et al. | 707/204 |
| 2007/0219935 | A1* | 9/2007 | Surasinghe | 707/1 |
| 2008/0162591 | A1* | 7/2008 | Ganotra | G06F 17/30368 |
| 2008/0222159 | A1 | 9/2008 | Aranha et al. | |
| 2009/0100434 | A1* | 4/2009 | Burghard | G06F 9/466 |
| | | | | 718/103 |
| 2009/0240742 | A1* | 9/2009 | Burghard et al. | 707/202 |
| 2010/0122053 | A1* | 5/2010 | Prahlad et al. | 711/162 |
| 2010/0191713 | A1* | 7/2010 | Lomet et al. | 707/704 |
| 2011/0251997 | A1* | 10/2011 | Wang et al. | 707/634 |

OTHER PUBLICATIONS

"Distributed Multi- level recovery in Main-Memory Databases," Philip Bohannon, Bell Laboratories, 1996.*

Jonas S. Karlsson "An Implementation of Transaction Logging and Recovery in a Main Memory Resident Database System" Published Date: Unknown, 47 pages.

"Exchange Databases and Storage Groups", Published Date: 2010; 1 Page.

H. V. Jagadish, "Dali: A High Performance Main Memory Storage Manager", Published Date: Unknown; 16 Pages, http://webcache.googleusercontent.com/search?q=cache:U1FBuim6e1UJ:citeseerx.ist.psu.e.

Seungkyoon Woo, et al., "Accomodating Logical Logging Under Fuzzy Checkpointing in Main Memory Databases", Published Date: 1996, 14 Pages, http://webcache.googleusercontent.com/search?q=cache:SY80Ck-pCCQJ:dbserver.kaist.ac.

Rajeev Rastogi, et al., "Distributed Multi-Level Recovery in Main Memory Databases", Published Date: Jul. 28, 2010, 34 Pages.

"Office Action and Search Report Issued in Chinese Patent Application No. 201110346184.3", dated Dec. 4, 2013, 13 Pages.

"Office Action Issued in Chinese Patent Application No. 201110346184.3", dated Aug. 5, 2014, 10 Pages.

"Fourth Office Action and Search Report Issued in Chinese Patent Application No. 201110346184.3", dated Jul. 30, 2015, 13 Pages.

"Third Office Action Issued in Chinese Patent Application No. 201110346184.3", dated Jan. 23, 2015, 9 Pages.

"Office Action Issued in Chinese Patent Application No. 201110346184.3", dated Jul. 6, 2016, 8 Pages.

"Fifth Office Action Issued in Chinese Patent Application No. 201110346184.3", dated Jan. 20, 2016, 9 Pages.

* cited by examiner

In-Memory Row Representation 1300

| 1 | 2 | 3 | 4 | 5 | 6 | 7 | 8 |
|---|---|---|---|---|---|---|---|
| Logical Page 1 || Logical Page 2 || Logical Page 3 || Logical Page 4 ||

First Checkpoint 1310

| 1 | 2 | Unused | 3 | 4 | 5 | 6 | Unused | 7 | 8 |
|---|---|---|---|---|---|---|---|---|---|
| Page 1 (full) ||| Page 2 (partially full) ||| Page 3 (partially full) ||| Page 4 (full) ||

Row 2 deleted
Row 6' inserted

↓

Second Checkpoint 1320

| 1 | Unused | Unused | 3 | 4 | 5 | 6 | 6' | 7 | 8 |
|---|---|---|---|---|---|---|---|---|---|
| Page 1 (partially full) ||| Page 2 (partially full) ||| Page 3 (full) ||| Page 4 (full) ||

2 pages saved

FIG. 13

VERSATILE IN-MEMORY DATABASE RECOVERY USING LOGICAL LOG RECORDS

TECHNICAL FIELD

The subject disclosure relates to recovery in database systems and, more specifically, to logging and commit procedures for versatile database system recovery.

BACKGROUND

A database system can implement various mechanisms in order to ensure that transactions executed on the database system produce a correct result. For instance, a database system can implement a concurrency control mechanism to isolate multiple concurrently executing transactions from each other and/or to prevent such transactions from interfering with one another in other suitable manners. By way of another example, a database system can implement one or more mechanisms for ensuring consistency and/or recovery of data items associated with the database system.

A database recovery subsystem (RS) manages recordation of various operations performed within an associated database system, which in turn facilitates mirroring of the database system, recovery of data items associated with the database system in the event of a system crash or other failure, and/or other means that enhance resiliency and robustness of the associated database system. In various database system implementations, operations are conducted primarily in one or more disk-based data stores or other similar storage media, and a RS may log such operations with reference to physical location(s) within the data stores associated with the operations. For instance, data stores in a database system can be divided into pages or other suitable storage units, and operations affecting one or more pages can be logged by the RS along with the page(s) affected by the operations. In some cases, finer physical location information, such as row position or storage addresses within a particular page, can be logged along with the relevant page identities. In addition, the RS can obtain physical checkpoints of one or more pages that indicate the data stored in the checkpointed page(s) at the time of checkpointing. Subsequently, in the event that reconstruction of the database system is initiated due to a system crash or failure and/or other reasons, the database system can be reconstructed by restoring the respective pages in the system to states indicated by one or more checkpoints. In addition, changes to one or more pages or other physical data locations made after creation of the checkpoint can be reconstructed as indicated by the log of operations maintained by the RS.

However, for some database systems, such as database systems that are designed to primarily operate in memory (e.g., as opposed to primarily on-disk database systems as described above), various design considerations are desirable in order to adapt an associated RS to the needs of the particular database system being implemented. For example, for some database system implementations, it would be desirable for a RS implementation to allow for enhanced versatility, parallelism, integration with other database systems and/or other systems, mirroring capabilities, and the like.

The above description of today's database recovery techniques is merely intended to provide an overview of conventional systems, and is not intended to be exhaustive. Other conventional systems and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In one or more embodiments, a recovery subsystem associated with a database system can be managed in various manners as described herein to facilitate versatile and highly functional logging and recovery within an in-memory database system and/or other suitable database systems. Various embodiments herein provide versatility in order to allow a RS to serve the needs of crash recovery, high availability (HA), e.g., mirroring, backup/restore, and other suitable functions. In addition, various embodiments herein provide parallelism to allow for receipt of recovery information at a RS concurrently from multiple log streams and/or multiple HA connections, in some cases with no predictable ordering. Further, some embodiments herein facilitate RS design that integrates with existing two-phase commit protocols, thereby enabling inter-operation between an associated database system and one or more outside database systems and/or other systems. Additionally, some embodiments herein define visibility rules and/or other mechanisms by which a mirrored database node can additionally function as a readable secondary node.

In an embodiment, some or all of the above design considerations are implemented via logical logging, wherein respective transactions operating on data within the database system are logged without reference to the locations of the data or any other physical information. In another embodiment, database transactions are processed without use of a buffer pool. As a result, database transactions are managed without requiring the writing of "dirty" data to disk and without requiring the storage of undo information and/or other information relating to reversal of a transaction.

Within a logical log as maintained as described above, information relating to a database transaction is recorded in a single log record. Log records can be configured to carry information about a single transaction, or in alternate embodiments, multiple transactions can be grouped into a log record. Within a log record, respective fields can provide a begin timestamp and an end timestamp and/or other information indicative of the period of time in which a corresponding transaction is active. This information can form the basis of a logical checkpointing system, where the state of a database system can be reconstructed by repeating transactions recorded in respective log entries in an order designated by the begin and end timestamps of the transactions without reference to physical locations at which the transactions operate. By eliminating dependencies on physical checkpoint information in this manner, a database can be constructed or reconstructed at various associated database nodes, including secondary nodes, independent of the storage configuration or input/output (I/O) capabilities of such nodes. In some embodiments herein, checkpoint size can be reduced by implementing partial checkpoints, differential checkpoints, and/or other techniques.

In addition to enabling logical checkpointing, a log record structure as provided above allows for logging of a database system to be conducted via multiple independent log streams, each of which can be assigned to different I/O devices or the like for increased efficiency, more optimal resource usage, etc. A RS implementing multiple log streams can in some cases merge, split, or otherwise manipulate log streams in order to accommodate changes to the overlying operating environment, failure of one or more I/O devices associated with respective log streams, or other scenarios. Additionally, by merging, splitting, or otherwise manipulating a set of log streams, a database system can account for different geometry at a mirror node; for instance, a mirror node can receive recovery information on a set of log streams and adjust the log streams to accommodate a local system configuration.

In further embodiments herein, an in-memory database system can leverage logical logging as described above to manage transactions operating on data within the database system without the use of write-ahead logging. For example, data modified in memory by a transaction can be restricted from being written to disk until after the transaction has committed and been recorded in a log record. Further, as noted above, undo information and/or other information relating to reversal of the transaction can be discarded upon commitment of the transaction.

Additionally, various embodiments herein provide a layered commit procedure by which a transaction can be committed in multiple stages. First, a transaction is physically committed by hardening information associated with recovery of the transaction in the database system. Second, the transaction is logically committed by applying the changes made by the transaction throughout system memory. Third, the transaction is visibly committed by making the results of the transaction visible to entities outside the database system. In an embodiment, this layered commit procedure can be used to integrate multiple database systems into an ostensibly single database system, thereby providing database users with the benefits and functionality of multiple database systems in a transparent manner.

These and other embodiments are described in more detail below.

BRIEF DESCRIPTION OF THE DRAWINGS

Various non-limiting embodiments are further described with reference to the accompanying drawings in which:

FIG. 13 is an illustrative view of an exemplary differential checkpointing technique;

DETAILED DESCRIPTION

Overview

Figure 1:
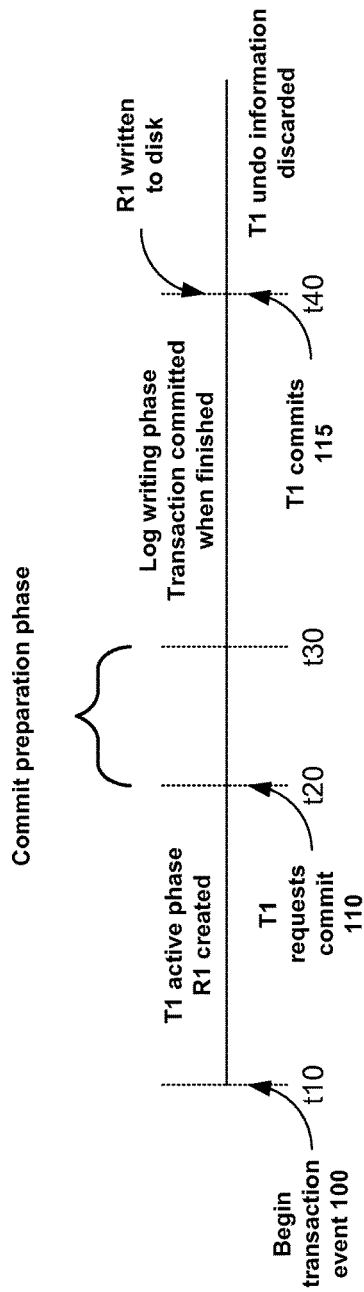
FIG. 1 is an illustrative overview of an exemplary lifetime of a transaction in a database.

By way of introduction, database systems can facilitate management of respective associated data items by way of operations such as, but not limited to, data creation and maintenance, information retrieval, data access via searching or other mechanisms, and so on. In some embodiments, a database system can provide various mechanisms to ensure the recoverability and integrity of associated data. For example, a database system can manage operations performed within the system (e.g., associated with respective transactions executed by the database system) in order to ensure that such operations produce a correct result. By way of example, and not limitation, a database system can incorporate concurrency control mechanisms to ensure that respective transactions concurrently executed by a database system do not interfere with each other. In addition, a database system can incorporate various other mechanisms to ensure proper operation. As non-limiting examples, a database system can utilize various mechanisms that ensure consistency, integrity, and/or recoverability of data associated with the system.

In one example, database systems can be utilized to manage information stored in at least one data store. By way of example, and not limitation, an in-memory database can be designed and implemented to manage data stored in a corresponding computer memory or any other suitable non-transitory computer storage medium. Various non-limiting embodiments of in-memory database systems, or other database systems which can be used to provide similar functionality, can generally provide low-level functionality with respect to an associated data store. Such functionality can include, for example, support for transactions and/or lookup, cursors, and the like. In addition, such database systems can provide support for various higher-level functions, either directly or indirectly through cooperation with one or more disparate systems that provide such functionality. Examples of higher-level functionality that can be directly or indirectly supported by a database system include, but are not limited to, generation or control of an associated user interface, support for queries based on various query languages (e.g., the American National Standards Institute (ANSI)/International Standards Organization (ISO) structured query language (SQL), XQuery, etc.), and so on.

Additionally, database systems can implement a recovery system (RS) and/or other mechanisms configured to preserve information stored in connection with a database system in the event of a crash of the system, a data storage device failure, and/or other events for which recovery of data associated with the database system is desirable. Generally, a RS provides resiliency to a database system via logging of respective operations performed on data within the database system, data storage device mirroring and redundancy, checkpointing, and other suitable techniques.

Some database systems, such as disk-based database systems employing Algorithms for Recovery and Isolation Exploiting Semantics (ARIES) as generally known in the art and/or other conventional database system(s) that can employ other suitable recovery techniques as known in the art, record operations performed on data within the database system using physical logging. In a physical logging scheme, data modified within the database system are recorded along with the physical locations of the data. A variation of physical logging is hybrid physical-logical logging, or "physiological" logging, wherein a structured index is maintained that contains index records directly or indirectly corresponding to respective pages on disk and/or other suitable units of associated data stores. Upon an operation on data corresponding to one or more pages (e.g., inserting data, deleting data, etc.), a log record indicating the operation and the physical page(s) affected by the operation is generated and indexed using the appropriate index record(s).

In physical or physiological logging techniques as described above or other suitable logging techniques, log records are assigned a sequence corresponding to an order in which the corresponding operations were performed within the data store. Accordingly, a log record in such a system includes sequence information, page information (or other location information), and transaction information.

In contrast to the conventional database systems described above, various other database systems exhibit characteristics that make the above aspects of recovery subsystem design ineffective or inapplicable. By way of example, an in-memory database system can be configured to operate primarily within memory (e.g., as opposed to on-disk data stores). Accordingly, database logging mechanisms that record database transactions with reference to physical pages, disk locations, and/or other information relating primarily to on-disk data stores provide minimal utility to such a database system.

In addition to the above, a recovery system implemented within some in-memory database systems and/or other suitable database systems may have various desired features, at least some of which are not considered within traditional recovery subsystem designs. For example, a recovery subsystem may be desired to provide versatility to serve the needs of crash recovery, high availability (HA) or mirroring and backup/restore. In addition, a recovery subsystem may be desired to enable parallelism, such that recovery information is allowed to arrive concurrently from multiple log streams and multiple HA connections, in some cases with no predictable ordering. Further, a recovery subsystem may be desired to integrate with existing two-phase commit protocols. In one embodiment, this integration can enable a database system to inter-operate with one or more other database systems, as further described herein. Additionally, a recovery subsystem as described herein may be desired to enable readable mirrors by, e.g., defining visibility rules such that a mirrored node can also function as a readable secondary.

In this regard, in various embodiments as set forth herein, database recovery management schemes are proposed that address at least the above limitations of existing schemes. In addition, other benefits of the recovery schemes are provided herein. It can be appreciated that the benefits of various embodiments as described herein are intended solely as non-limiting examples of benefits that can be realized via use of such embodiments. Further, the respective schemes provided herein are not intended to be regarded as preferred over one another with respect to any of the stated benefits and/or any other benefits that can be realized from such schemes.

In one embodiment, a database management system includes a log manager component configured to generate one or more log records in a logical log record format relating to a transaction operating on data in at least one data store. In such a system, information relating to reversal of the transaction (e.g., undo information) is discarded in response to commitment of the transaction.

The system can include at least one persistent data store configured to store information corresponding to respective transactions, and in such an example the system can additionally include a component configured to prevent writing of data corresponding to one or more uncommitted transactions to the at least one persistent data store.

The log manager component can be further configured to record a plurality of transactions operating on data in at least one data store in one or more log records. Further, the log manager component can include a log stream management component configured to maintain one or more log streams that are associated with respective log records. The log manager component can be further configured to reorganization of log streams at least in part by merging log streams or splitting log streams.

In some implementations, the log stream management component is further configured to load a plurality of log streams in a parallel manner. Additionally or alternatively, the log manager component is further configured to facilitate insertion of respective database rows corresponding to a plurality of log streams into an index corresponding to at least one data store in a parallel manner.

The log manager component can also be configured to record a begin time of a transaction and an end time of the transaction in corresponding log record(s). Based on this log record structure, the system can further include a recovery component configured to reconstruct an operating state of at least one data store at least in part by applying transactions recorded via respective log records in an order determined based on the start times and end times of the transactions as recorded in their respective log records.

The system can additionally include a recovery subsystem integration component configured to integrate respective transaction log records of the log manager component with respective log records of at least one disparate database system. In doing so, the system creates an appearance of a common log that includes the transaction log records of the log manager component and the transaction log records of the at least one disparate database system.

The log manager component can include a checkpointing component configured to generate at least one checkpoint indicative of a state of at least one associated data store without reference to respective physical locations in the data store(s). In some embodiments, the checkpointing component is further configured to generate a set of partitioned checkpoints respectively indicative of the state of respective designated portions of the at least one data store. Alternatively, the checkpointing component can be further configured to generate at least one differential checkpoint indicative of the state of respective data in the at least one data store that has been modified since a previous checkpoint. In other implementations, the checkpointing component is further configured to initiate checkpoint loading in parallel with loading of a log via the log manager component.

The system can also include a transaction processing component configured to commit a transaction via a physical commit in which recovery information corresponding to the transaction is persistently recorded, a logical commit in which changes to data in the at least one data store caused by the transaction are visible to other transactions within the at least one data store, and a visible commit in which a result of the transaction is made available to entities outside the at least one data store.

In another embodiment, a method for maintaining a database recovery system includes receiving information relating to a transaction operating on data in at least one in-memory data store, logging the transaction in one or more log records according to a logical log record format, discarding reversal information relating to the transaction in response to commitment of the transaction, and preventing writing of data corresponding to one or more uncommitted transactions to at least one corresponding persistent data store.

The logging, in some implementations, can include logging the transaction without reference to location of the data in the data store(s) on which the transaction operates.

The method can also include maintaining a plurality of log streams, in which case the logging can additionally include logging a transaction using a log stream selected from the plurality of log streams. In such an implementation, the maintaining can include assigning respective input/output devices to the respective log streams of the plurality of log streams.

In further implementations, the method includes generating at least one checkpoint relating to a state of at least one in-memory data store without reference to respective physical locations in the at least one in-memory data store.

In still another embodiment, a method for maintaining a database recovery system includes identifying a local log stream configuration, receiving transaction log information relating to at least one data store over a plurality of log streams, and conforming the plurality of log streams to the local log stream configuration by at least one of merging at least one log stream of the plurality of log streams or splitting at least one log stream of the plurality of log streams.

The method, in some implementations, can include identifying a series of transactions recorded within the transaction log information and reconstructing an operating state of the at least one data store to which the transaction log information relates at least in part by performing the series of transactions on at least one local data store.

Herein, an overview of some of the embodiments for achieving database system recovery has been presented above. As a roadmap for what follows next, various exemplary, non-limiting embodiments and features for database system recovery are described in more detail. Then, some non-limiting implementations and examples are given for additional illustration, followed by representative network and computing environments in which such embodiments and/or features can be implemented.

Database Recovery Subsystem

With respect to recovery subsystem design, various embodiments described herein are provided in the context of an in-memory database system. It should be appreciated, however, that the embodiments provided herein are not intended to be limited to any specific database system implementation, unless explicitly stated otherwise. Further, unless stated otherwise, the hereto appended claims are not intended to be limited to any database system implementation(s).

Additionally, various exemplary implementations are provided in which one or more embodiments write to and/or otherwise manage disk storage. It should be appreciated, however, that disk storage is merely one example of persistent storage that can be utilized by the embodiments herein and that any suitable type(s) of disk storage can be utilized in a similar manner to disk storage as described herein. Accordingly, unless explicitly stated otherwise, references to disk storage and/or management as used herein are to be regarded as interchangeable with any other suitable type(s) of persistent storage.

By way of further description with respect to one or more non-limiting aspects of a log design that can be employed by a database recovery subsystem, various non-limiting characteristics associated with an exemplary logging scheme that can be implemented within a database system can be achieved. By way of a first example, a logging scheme as described herein operates without a buffer pool or writing "dirty" data (e.g., data associated with a transaction not yet committed) to disk. As a result, a database system implementing embodiments provided herein can be configured to never harden undo log records. For example, undo log records can be used in memory to allow a transaction to roll back any changes made; however, once the transaction is committed, a logging scheme as described herein discards the in-memory undo log. In contrast, a redo log is hardened by the logging scheme and used in recovery. Further detail regarding the construction of a redo log is provided herein.

As dirty data is never written to disk, a database system need not perform Write Ahead Logging to force log changes to disk before dirty data. Accordingly, a log can be constructed wherein the smallest unit of I/O is at least one full transaction. Moreover, in some database systems (e.g., depending on hardware capabilities, etc.), multiple full transactions can be grouped into a single I/O unit. These group I/O units, referred to herein as log arenas (LAs), provide a large increase in transaction processing efficiency by enabling group commit of multiple transactions and/or other improvements over conventional transaction processing schemes.

While the embodiments presented herein utilize a single log arena for a transaction, it should be appreciated that a recovery subsystem need not write an entire transaction in a single log arena. Instead, transactions can be split across multiple log arenas in some implementations.

As another example characteristic of recovery subsystem embodiments presented herein, a logging scheme can be configured to utilize a pure logical log, in which no physical information is saved to the log. As a result, a recovery subsystem can use multiple independent log streams to harden its log. Respective log streams can in some cases be configured to use different I/O devices, which can be used to facilitate log scalability, resiliency (e.g., by migrating log writes to other devices in the case of an I/O device failure), and/or other benefits.

By way of additional illustration, FIG. 1 shows exemplary processing of a transaction T1 that creates a record R1 with respect to a recovery subsystem as described in accordance with various embodiments herein. While FIG. 1 illustrates a series of events occurring at respective times, it should be appreciated that the times given in FIG. 1, as well as the ordering of events within FIG. 1, is not intended to be limiting with respect to the timing or ordering of events that can be occurred in accordance with the embodiments herein. Further, the times given in FIG. 1 are not assigned to scale, and no scale relating to the time between respective events is intended to be implied via FIG. 1.

As illustrated in FIG. 1, a transaction T1 enters an active phase upon a begin transaction event 100 (e.g., at time t10). Subsequently, transaction T1 can request to commit at event 110 (e.g., at time t20), at which time transaction T1 enters a commit preparation phase for validation and/or any other operations that are to be performed prior to commitment of transaction T1. Transaction T1 then enters a log writing phase upon completion of the commit preparation phase (e.g., at time t30), after which transaction T1 commits at event 115 (e.g., at time t40). As further shown in FIG. 1, in the event that transaction T1 creates a record R1, record R1 can be written to disk at the time T1 commits. Further, undo information created during the processing of transaction T1 is discarded after commitment of T1.

Figure 2:
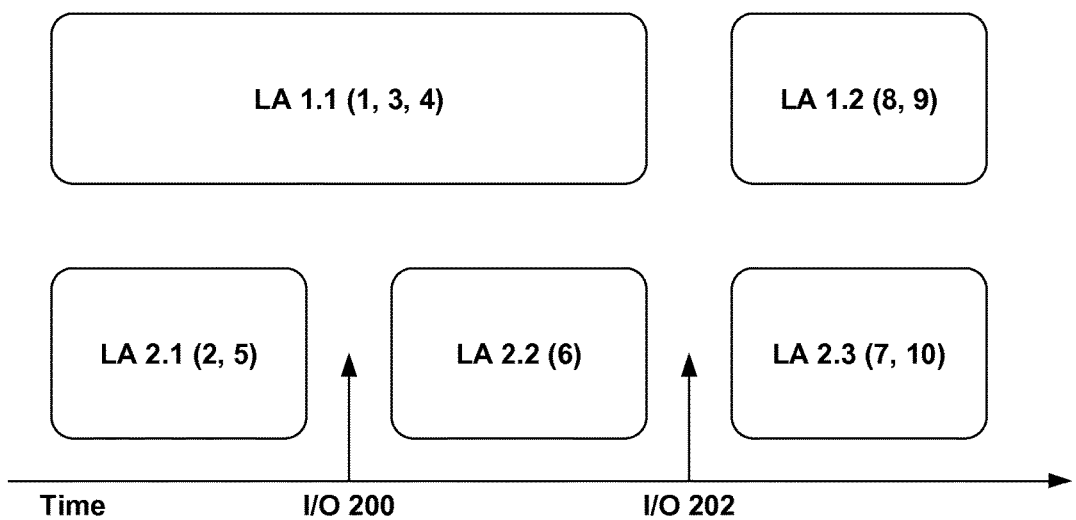
FIG. 2 is an illustrative view of an exemplary set of log streams maintained by a database recovery subsystem.

Turning to FIG. 2, an illustrative overview of the layout and functional aspects of an exemplary log configuration according to various embodiments is presented. FIG. 2 illustrates two log streams. The upper stream contains two log arenas: LA 1.1, carrying information relating to transactions 1, 3, and 4; and LA 1.2, carrying information relating to transactions 8 and 9. The lower stream contains three log arenas: LA 2.1, carrying information relating to transactions 2 and 5; LA 2.2, carrying information relating to transaction 6; and LA 2.3, carrying information relating to transactions 7 and 10. Each log arena represents a single unit of I/O, as described above. As FIG. 2 further illustrates, log arenas can be delimited by I/O events, e.g., I/O events 200 and 202.

In a HA configuration, log arenas can serve as the basic unit of I/O on both primary and secondary nodes. Thus, in an embodiment, mirroring does not split log arenas on a mirror in a different layout than that used on the primary node. However, it can be appreciated that mirroring nodes can be configured with a different number of log streams, and the log arenas assembled on the primary node in such a case are distributed on the mirror in a manner consistent with the configuration available on the mirror. By way of non-limiting example, in the example shown in FIG. 2, a mirror configured with three log streams could configure the streams such that LA 1.1 and LA 2.3 use a first log stream, LA 2.1 uses a second log stream and LA 2.2 uses a third log stream.

Figure 3:
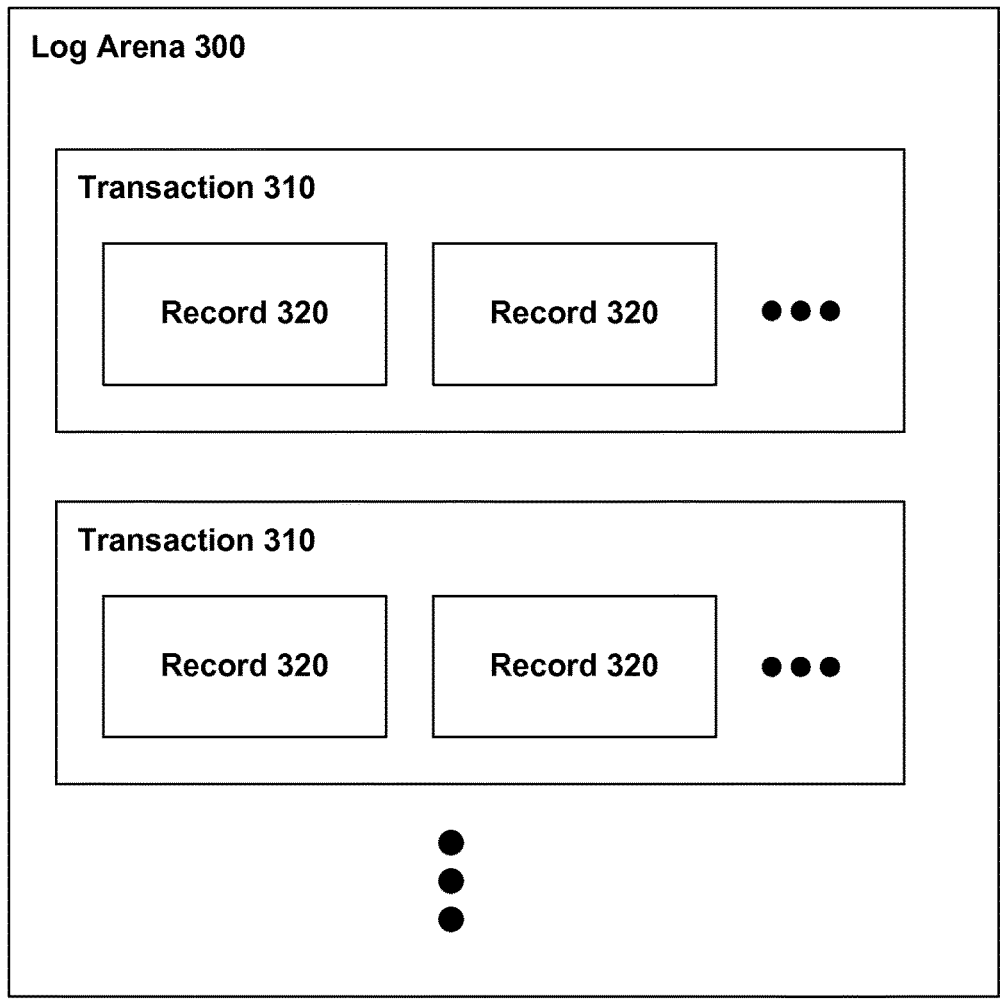
FIG. 3 is an illustrative view of an exemplary log structure.

In an embodiment, a log arena can carry information relating to respective associated transactions, each of which in turn can carry information relating to respective associated records, in various manners. An example structure that can be utilized for a log arena is illustrated by FIG. 3 and described herein. As shown in FIG. 3, a log arena 300 can contain information relating to one or more transactions 310. The information corresponding to transactions 310 can, in turn, contain information relating to one or more records 320 associated with the transactions 310.

By way of specific, non-limiting example, respective information fields and structures that can be utilized within a log arena 300 and its constituent parts are now described in further detail. It should be appreciated that the structure provided below is only one way in which information can be structured in accordance with the embodiments herein and that any other suitable structuring of appropriate information could be utilized.

With regard to transaction level information, respective fields can be saved for respective transactions contained in a log arena with transaction-wide granularity. For example, begin and end timestamp fields can be used to identify a transaction in the system. Additionally, a standalone field can be set to "true" when the transaction was not part of a two-phase commit transaction. If this field is set to "true," the transaction log can be regarded as contiguous and contained in the current log arena (e.g., no commit records, as described below). Otherwise, a master transaction identifier field can identify the transaction identifier for the corresponding master transaction, and a master commit log sequence number (LSN) field can identify the progress of the master transaction. In an embodiment, this can serve as part of a cross anchor that synchronizes a log as constructed in accordance with embodiments herein with a disparate log.

When the standalone field is set to false, a commit record belonging to the corresponding transaction can in some cases also be found in the current log arena or a later log arena. In an embodiment, the commit record is added asynchronously to indicate that the transaction has committed and that information relating to its outcome can be discarded by the master transaction.

In another example, a log arena can include an abort record field. When the system is in a HA configuration, this field can include all transactions that have aborted after being issued an 'End' timestamp (e.g., in validation) and are being logged in order for the recovery subsystem to successfully reconstruct the commit lineage on respective mirror nodes.

With regard to record level information, various fields can be saved at log record granularity. In an embodiment, a log contains a series of Log Insert Records (LIRs) and Log Delete Records (LDRs) for a given transaction. These records can be used by the recovery subsystem to re-establish a full in-memory image of the database system. A LIR can be associated with a 'Begin' field corresponding to the end timestamp of the transaction that created the version (e.g., as known based on the transaction level information) and an 'End' field set to infinity. Similarly, a LDR can be associated with a 'Begin' field set to the end timestamp of the transaction that created the version and an 'End' field set to the end timestamp of the transaction that deleted the version (e.g., as known based on the transaction level information). In one example, the 'End' field corresponding to respective LDRs can be saved along with individual log records to facilitate recovery of the database system.

In view of the above, record level information can include an operation field that indicates an insert operation or a delete operation, which in turn indicates the kind of log record that follows. If the operation field indicates a delete operation, a begin timestamp field can be used to store the end timestamp for the transaction that created the record. This field may not exist in the case of an insert operation. Further, a table identifier field can contain a table identifier, which can be used to locate the table object for the row corresponding to the record. In addition to the above fields, a payload field can contain the actual data for the row. This can be, e.g., the actual content of the row for an insert operation. Alternatively, in the case of a delete operation, there may be cases when less information is saved (e.g., in the case of a table with a unique key, in which case the key alone can be used).

Figure 4:
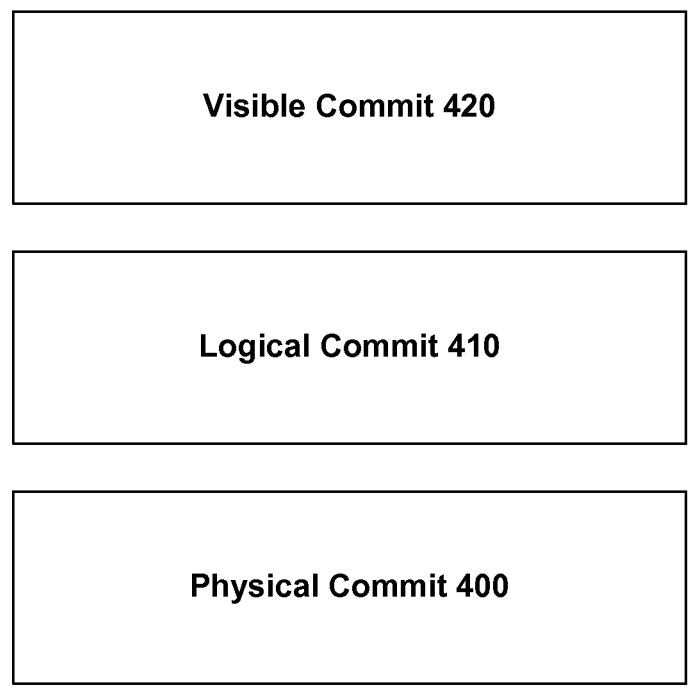
FIG. 4 is an illustrative overview of commit phases utilized in relation to a database transaction.

With reference to commit handling, the definition of a commit with respect to recovery can be made dependent on the scenario specific to a given transaction. As used herein, the term "commit" is layered in a hierarchy along the following dimensions, which are additionally illustrated by FIG. 4. As shown in FIG. 4, physical commit 400 forms the lowest layer in the commit hierarchy. As used herein, physical commit 400 refers to the first point in time at which all information used in recovering a transaction is hardened in the system. In an embodiment, physical commit 400 leverages a comprehensive description of the log fields used in physical commit as well as a sequence of I/O operations that substantially guarantee recovery. These aspects are described in further detail herein.

As shown next in FIG. 4, logical commit 410 forms the middle layer in the commit hierarchy. As used herein, a transaction is committed logically at the first point in time at which its memory data structures are marked committed and its changes are applied throughout system memory. In an embodiment, logical commit 410 is responsible for applying in-memory changes to a recovering system.

As additionally shown in FIG. 4, visible commit 420 forms the upper layer in the commit hierarchy. Visible commit 420 refers to the first point in time at which the results of a transaction are made visible to an external observer. Accordingly, the realization of visible commit 420 trails that of physical commit 400 and logical commit 410.

In an embodiment, the hierarchy shown in FIG. 4 can form all or part of a sequence with which transactions are committed. Thus, in one non-limiting example based on the hierarchy in FIG. 4, a transaction cannot be logically committed until it has been physically committed. In a similar non-limiting example, a transaction cannot be visible committed until it has been logically committed. It should be appreciated, however, that this commit sequence is intended merely as an example by which a transaction can be committed in a database system and, unless explicitly stated otherwise, the embodiments herein are not intended to be limited to any specific commit procedure(s).

The following describes operation of the physical commit 400, logical commit 410, and visible commit 420 as used in FIG. 4 in further detail. As stated above with regard to the commit hierarchy shown in FIG. 4, the following description is exemplary and non-limiting, and it can be appreciated that any suitable technique(s) for committing a transaction can be utilized.

With reference first to physical commit, the following outlines the meaning of physical commit for respective scenarios where a database transaction can be involved. As a first example, a scenario involving one phase commit, a single system instance, and no outgoing dependency can occur when a transaction purely associated with a database system implementing various embodiments herein with no dependencies finishes client code processing. The transaction can enter validation upon completion of client code processing. Upon successful validation, a log section can be allocated and populated inside of a single arena. The section is then marked as standalone and is hardened. In this scenario, the transaction is considered physically committed when the log I/O completes successfully.

In an embodiment, a transaction can generally be considered physically committed for non-two phase commit transactions at the point when the log has been successfully hardened. Further, in the particular case described above, physical, logical and visible commit substantially coincide with the log I/O completion.

If the log I/O write operation fails, the corresponding database is marked offline and recovery occurs. In some cases, this may trigger a failover in an HA setup, which is then communicated to the master transaction instance in order for the master database itself to follow suit (e.g., go offline). It can be appreciated that failure to conduct recovery in this manner could break the single system image illusion in the case of an integrated database by failing in one system but not another. In another example, use of a parallel log configuration as described herein can enable a repeated attempt of the failed I/O to another available log stream and continue running by taking only the failed log stream offline.

A similar notification mechanism can be utilized when the log of an externally associated database fails. In this case, the database can be taken offline together with the externally associated database regardless of whether the failure occurred due to a mixed-system transaction or not.

As another example, a scenario with one phase commit, a single system instance and outgoing dependency can occur where, e.g., a transaction T1 has a commit dependency on another transaction T2. In this case, T1 can build and submit its log in parallel with T2. If both log I/Os complete successfully, T2 is physically committed. In response to the commitment of T2, the dependency of T1 on T2 can be removed and T1 can be activated. In the absence of other dependencies, T1 then becomes immediately physically committed and proceeds to mark itself logically committed shortly thereafter.

Alternatively, if the log I/O of T2 fails, T2 is never considered committed and the database moves into recovery as described in the scenario above.

In another alternative, the log I/O of T1 may fail and the log I/O of T2 (preceding, trailing, or parallel) may succeed. In this case, it can be appreciated that T2 is still never considered physically committed because, at recovery time, the transaction log of T1 will be unavailable; therefore, log replay will stop before reaching the (perfectly consistent but now orphaned) T2 log.

Still another scenario involving two phase commit and a single system instance can occur when a transaction being committed is a slave transaction to a master transaction associated with an externally associated database. In this case, the transaction receives a 'Prepare' request from the master, during which it hardens its log in a manner similar to the cases above. In contrast to the above scenarios, however, the log section associated with this transaction is marked with a false standalone field to indicate that additional coordination is to be conducted on recovery before determining whether the transaction has committed. In addition, the master transaction identifier field as described above can be populated in the log with the value of the master transaction identifier. In an embodiment, the system issues the hardening request as in the previous cases, but on return from a successful I/O the transaction does not transition to a committed state. Rather, the transaction remains in the validating phase waiting for a 'Commit' notification from the master transaction.

When the master transaction commits, the external system associated with the master transaction informs the dependent transaction that the entire commit has succeeded. Upon receiving this information, a commit record I/O is issued for the same log stream where the commit has been issued. It can be appreciated that the commit log record may or may not be contained in the same log arena as the general log record. Once the I/O has been issued (or before it is issued), the transaction is marked as being committed and taken through post-processing and garbage collection.

In the scenario just described, it can be appreciated that it is possible for the transaction to be logically (and visibly) committed before the commit log record makes it to disk. This does not infer that physical commit followed logical commit, as by the time the 'Commit' call is issued by the master transaction, the log at the externally associated system already contains a hardened commit log record that marks the effective end of the physical commit processing for this transaction.

On recovery, a transaction involved in two phase commit is deemed to have been previously physically committed when either the commit log record is found in the log stream where a corresponding previous log section with a false standalone field has been found, or when the recovered master transaction can be determined to have successfully committed.

In the case of data dependencies between transactions (e.g., T1#2PC->T2), it can be appreciated that the work associated with the 'Prepare' request for T1 cannot be completed as in the main scenario above until the transaction on which T1 depends (e.g., T2) finishes its validation and its commit processing. Accordingly, a change can be introduced in the way activation for T1 occurs upon the completion of T2. Ordinarily, it can be appreciated that commit dependencies use the thread of the committing transaction to impersonate the waiting transaction. In this case, however, there are two distinct threads that need synchronized: the committing thread of T2 and the 'Prepare' thread of the master transaction.

In an embodiment, once the 'Prepare' thread is unblocked, this scenario can be handled in a similar manner to the normal case above. However, it can be appreciated that transactions, including read-only transactions that have taken commit dependencies can in some cases fail due to the fact that their commit dependency transaction has failed its own validation. In addition, in the case where the 'Prepare' thread fails for reasons other than log I/O failure, one or more changes can be made to the system associated with the 'Prepare' thread to report and/or react to such an occurrence correctly. For example, in the preceding scenario, the system can be configured to refrain from assuming log write failure and taking the database offline and instead to rollback and report the correct error.

In an alternative scenario, a transaction can be involved in two phase commit with an external database server, but the master transaction of the database server is read-only. In this case, sufficient information can be saved both in the local transaction log and in the transaction log of the external database server such that, when the transaction is replayed elsewhere, the local transaction is not visible before the external transaction. In the event that the transaction of the external server is read-write, it can be appreciated that the foregoing is not an issue in some cases as the transaction identifier can be saved (e.g., in the master transaction identifier field in the local log record) and visible during recovery. In order to accommodate this scenario, the local transaction, when paired with a read-only external transaction, saves the current external LSN to the master commit LSN field. During recovery, this field can be used to wait for the local system state to match the state of the external system. Similarly, the log of the external system can be configured to save the current serialization timestamp for the local transaction, implementing in effect a cross log anchor.

In an embodiment involving a HA secondary node with one phase commit, log stream arenas are continually shipped from the primary node to the secondary node. It can be appreciated that the communication transport delivers arena fragments (e.g., with no ordering guarantees) to the secondary node and that full arenas become available only incrementally. Further, it can be appreciated that the transmission of arena information occurs in parallel with physical commit processing on the primary node, which proceeds as described in the corresponding single system scenario above.

In this scenario, physical commit is achieved when the first log arena is hardened on either one of the nodes involved in synchronous mirroring. In an embodiment, an immediate failover to the secondary node is configured to follow a log write fail on the primary node, making the "commit on first harden" rule described above logically correct.

In another embodiment involving a HA secondary node for transactions that were involved in two phase commit on the primary node, it can be appreciated that the secondary node cannot harden a log arena without making sure that the log of the master system for the corresponding arena is hardened first. This can be done, e.g., to prevent a scenario where a log arena containing both the transaction prepare data and the commit log record is received and hardened but the corresponding master transaction log is lost in transport and never arrives. If the received log arena is hardened in this scenario, it can be appreciated that a failover to the mirror node would find a log arena that indicates that a fully-committed transaction (e.g., such that both transaction prepare data and the commit record are found), but the corresponding master transaction log is not (and cannot ever be) recovered.

In order to prevent the above scenario, the local log arena can contain a section that describes the master transaction identifiers for all transactions in the arena (e.g., the master transaction identifiers field, as generally described above), and the arena I/O can follow the hardening of all master transactions with identifiers in the master transaction identifier set.

With reference next to logical commit, various scenarios are described herein that augment the description of physical commit as provided above with information pertaining to applying the hardened log records to an in-memory system image in order to obtain a functional system at recovery or a usable mirror during HA deployment.

Referring first to a scenario involving one phase commit, a single system instance, and no outgoing dependency, logical commit can occur once the log I/O completes successfully. Upon completion of the log I/O, the transaction can be marked committed, and remaining post-processing and garbage collection can be performed, substantially immediately.

A scenario involving one phase commit, a single system instance, and outgoing dependency can occur where a transaction is given an End timestamp (e.g., indicating a commit sequence), proceeds to validation, issues its log I/O and then, before being marked committed, is suspended pending completion of its outgoing dependency. While in this state, it can be appreciated that the transaction is still in-doubt, e.g., if the transaction it depends on fails, this transaction will fail as well. Once the preceding I/O completes successfully, this transaction itself will succeed.

In a scenario involving two phase commit and a single system instance, a transaction is asked to harden its log during the call of the master transaction to "Prepare." The corresponding log record can contain a false standalone marker, indicating that the data associated with the transaction is not yet known to be committed. On successful I/O completion, the transaction is left in an in-doubt state until the master transaction issues a 'Commit' call that changes the state of the transaction from "in-doubt" to "committed" (and schedules a commit log record for later).

In a scenario involving a HA secondary node and one phase commit, the mirror can be configured to maintain a serialized order of transactions sorted in the order of their commit (e.g., End) timestamp. This set of transaction objects is referred to herein as a serialized transaction timeline (STT). In order to build the STT, a full history of all the End timestamps issued on the primary node can be obtained on the secondary node. Further, a scheme can be used in this scenario that assigns sequential identifiers to all 'End' transaction timestamps as soon as the transaction has entered commit processing.

In an embodiment, the STT on the secondary node can be divided into two sections: a compact section of older transactions, where all transaction timestamps are sequential, all transactions are committed and there are no gaps in transaction sequence numbers; and a sparse region with holes for missing (or still open) transactions.

Given the manner in which 'End' timestamps are allocated as described above, the compact transaction history on the secondary node can be identified as a history where all transactions for all possible timestamps (e.g., sequential 64-bit integers) exist and are committed. In one example, this can be accomplished by configuring logging such that transactions that have aborted during validation (e.g., meaning they have already been issued an 'End' timestamp) on the primary node are also included in the log stream (e.g., via an abort record) for the purposes of making them available to the secondary node.

Each log arena fragment received by the secondary node can correspond to one or more transaction slots in the STT. The logical commit operation can stitch together fragments from adjacent arena fragments, which can in some cases span row log records, and then apply the newly received records to their in-memory containers (e.g., hash sets or skip lists) as appropriate.

However, it can be appreciated that there are cases where the newly received records cannot be immediately applied to their respective container. This can happen, e.g., when a record arrives out of order from previous versions of the same record and the previous version of the record has not yet been processed via the STT. When this situation occurs, the row log record which cannot yet be applied is appended to its (still opened) corresponding transaction, and the actual insert/delete operation is deferred until the high watermark of applied transactions reaches the current transaction. Put another way, the insert/delete operation is deferred until transactions with older commit timestamps have been fully applied and committed and the current transaction is at the top of the compact list of applied transactions. In response to this occurrence, the deferred work items (e.g., row log records) still pending with the transaction can be applied substantially immediately. As a compact transaction history precedes the current transaction, it can be appreciated that applying the still pending work items for the current transaction can be guaranteed to succeed at the relevant point in time.

It is to be further appreciated that, while the STT is a globally shared data structure, the scheme as described above is unlikely to introduce a concurrency limitation due to the fact that the STT can exhibit a large degree of parallelism. In addition, it can be appreciated that deferred work items will not cause substantial delay, as most of the work associated with reading the rows from the various arenas and apply them in their respective container can be done in parallel. For example, reading the log record, generating a new row based on the log record and computing the position of the new row can each be accomplished in parallel. Accordingly, the STT can be regarded as a large pipeline used to organize parallel application of transaction logs at recovery time.

In a scenario involving a HA secondary and two phase commit, the STT can function in a similar manner to the single phase commit case described above. It should be appreciated, however, that committing a transaction in the STT in the two phase commit case dependent on full application of the log records originating from the corresponding log arena. Further, such a transaction can in some cases need to be gated by a corresponding application of the master transaction log using the coordinated log anchors saved in the master transaction identifier and master commit LSN fields.

With further reference to visible commit, the following describes various visibility rules that can apply to transactions that have completed logical commit, as generally described above. In an embodiment, these rules can be designed in view of visibility needed by readable secondary nodes and the point in time during the recovery sequence at which the data is made visible to waiting clients. In a first scenario involving one phase commit, a single system instance, and no outgoing dependency, a transaction can be made visibly committed by the acknowledgment that follows after the transaction has been marked logically committed.

In another scenario involving one phase commit, a single system instance, and outgoing dependency, visible commit can be conducted in a similar manner to the previous scenario. Further, system behavior in this scenario can be derived from enforcement of dependencies for achieving the logical commit state. For instance, when a transaction T1 depends on a transaction T2 (e.g., T1->T2), the commit processing of T1 can be deferred until the outcome of T2 is known. In an embodiment, acknowledgement (ACK) messages provided back to a user can be similarly ordered in the event that such an ordering is useful for client ACK processing. Alternatively, an ordering utilized can be made secondary to client correctness standards.

In another embodiment, additional processing can occur in the case of transactions that are implemented over multiple stored procedures, referred to herein as multi-step transactions (MST). Expanding on the example above, T1 in some cases can be a MST that takes a commit dependency on T2 (e.g., by reading a row that was created by T2). Further, while T2 is still in doubt, T1 may need to return to the user as part of its multi-step processing. Accordingly, it can be appreciated that in this context T1 may reveal to an end user an item of data that is not yet guaranteed committed. While this occurrence does not create a correctness issue (as T1 would fail if T2 fails), it nonetheless may present an element of information disclosure. In an embodiment, this can be mitigated by enabling T1, before it returns to the user as part of its multi-step processing, to serialize behind a "commit barrier" that allows the notification corresponding to T1 to go through only when all of its dependent transactions have committed.

In a further scenario involving two phase commit and a single system instance, a user ACK can be issued as soon as the 'Commit' call from the master is received by the transaction. Further, during single-system crash recovery, the system can be configured to disallow new transactions until recovery completes. By doing so, visible commit can be deferred until the end of recovery. In one example, two phase commit recovery can be configured to create the STT and to apply respective transactions as they are read from the various log streams. In another example, transactions close when the totality of log arena, previous transactions and master transaction commit log records have been received.

It can be appreciated in this case that, in the absence of concurrent readers (e.g., as is the case in recovery), the issue of "visible commit" may be of less importance due to the absence of readers to which information is to be made visible. As a result, commit processing can be simplified during recovery in some cases by simplifying version handling. In an embodiment, this can be achieved at least in part by implementing logical commit and recovery in terms that mimic regular processing of transactions but do so by using an STT instead of regular user code to drive the data modifications.

In the contrasting case of crash recovery, garbage collection of old versions of data can be performed substantially concurrently with application of new versions of the same data in the event that there are no involved readers. By doing so, transactions can be processed such that no garbage is left behind. This can further simplify transaction processing by removing the need for validation processing, garbage collection processing, and post processing, and can in some cases provide significant speed increases for crash recovery.

As noted in the above cases, the STT in this scenario can be configured to preserve the dependencies on master transaction recovery processing. However, it should be appreciated that even in the absence of readers, there may be reason to continue applying a full STT-backed replay of transactions from their respective log arenas. For instance, depending on the checkpointing scheme utilized, applying the log fully and sending transactions to collection via garbage collection can in some cases be an efficient mechanism to obtain a checkpoint on a secondary node without any requirement on the primary node (e.g., shipping of checkpoint pages, etc).

In a scenario involving a HA secondary and one phase commit, an associated database system can adopt schemes for visible commit that are similar to those of disk-based database systems. For example, once a transaction is acknowledged back to the user, a second communication can be used to indicate to the secondary instance that it is safe to "show" the previously committed data to any reader on the readable secondary. This delay in visibility can be achieved by maintaining a "visibility high watermark," which is the last commit timestamp that has been acknowledged to the user and therefore can be safely shown to readers on the secondary. In one example, readers on the secondary can initiate a read-only transaction with this visibility watermark as its timestamp to avoid seeing any of the later changes already applied (e.g., changes that have logically committed but not yet visibly committed).

In another scenario involving a HA secondary and two phase commit, it can be appreciated that commit processing can be conducted in a similar manner to that described in the various other scenarios above. Further, in this scenario, an externally associated database can provide the progress report ACK notification from the primary node to the secondary node. In response, the system can use the master transaction identifier field as described above to synchronize visibility with the externally associated database.

Figure 5:
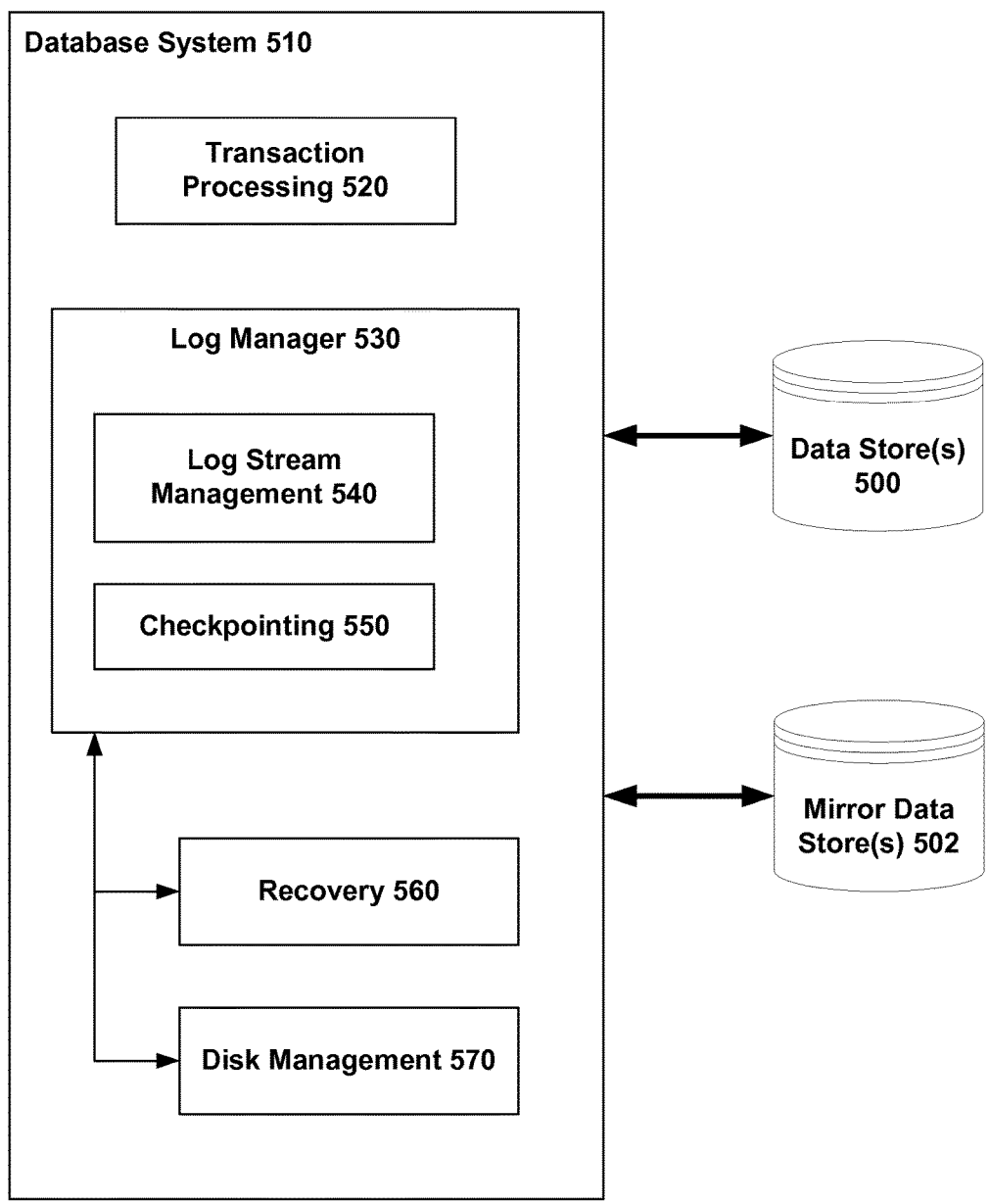
FIG. 5 is a block diagram showing a database system implementing transaction management and recovery mechanisms in accordance with one or more embodiments.

FIG. 5 is a block diagram showing an exemplary implementation of a database system 510. As shown in FIG. 5, database system 510 can be associated with one or more data stores 500 and/or one or more mirror data stores 502. In an embodiment, data store(s) 500 are associated with a primary database node while mirror data store(s) 502 are associated with one or more secondary nodes; however, it should be appreciated that any suitable configuration of data store(s) 500 and mirror data store(s) 502 can be utilized. In one example, data store(s) 500 and/or mirror data store(s) 502 can be in-memory data stores, disk data stores, or any suitable combination thereof. In one embodiment, a combination of in-memory and disk storage is used whereby in-memory data stores serve as primary data stores, in which database system 510 maintains data items and processes transactions operating on the data items. At various regular or variable intervals, data associated with in-memory data stores can then be written to disk. In this manner, data in memory can be organized independently of the manner in which data is arranged on disk, thereby providing improved flexibility and design simplicity, among other benefits.

Database system 510 can include a transaction processing component 520, which can facilitate commitment of a transaction according to the commit hierarchy illustrated by FIG. 4 and generally described above. Further, database system 510 includes a log manager component 530 configured to maintain a logical transaction log as described in accordance with embodiments herein. As described herein, log manager component 530 can be configured to log respective transactions by utilizing a single log record per transaction or group of transactions (e.g., a log arena). Further, as log manager component 530 is configured for logical logging, records are constructed by log manager component 530 without reference to physical locations of data associated with the records and/or any other physical location information.

Figure 6:
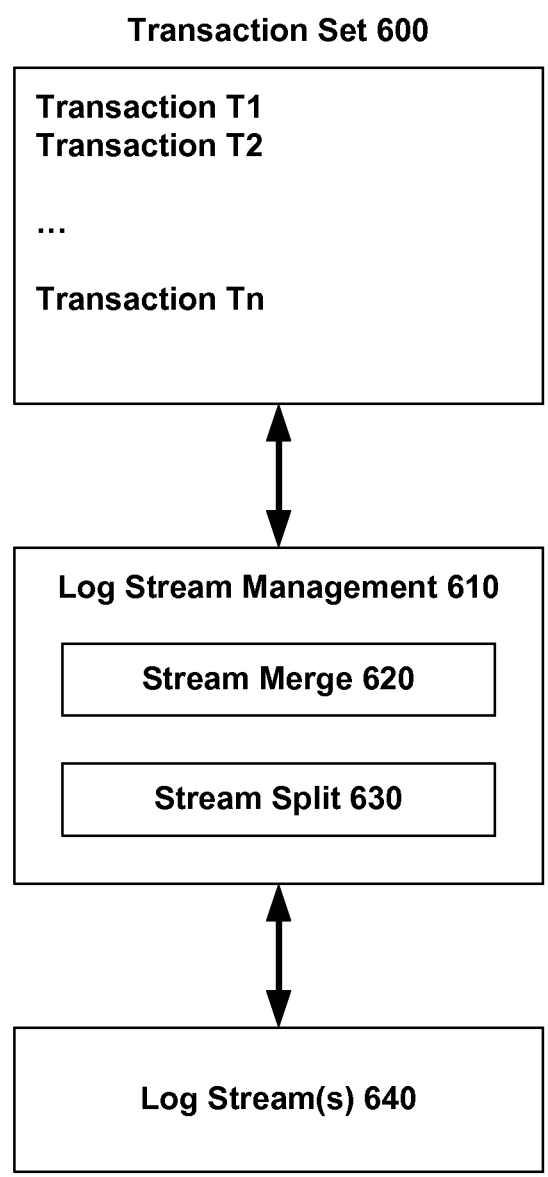
FIG. 6 is a block diagram showing exemplary functions of a log stream management mechanism in accordance with one or more embodiments.

Log manager component 530 includes a log stream management component 540, which can be configured to facilitate logging of database transactions via multiple log streams. As described above, log streams can be assigned to respective I/O devices and/or other suitable mechanisms for maintaining the log streams. In an embodiment, log stream management component 540 can maintain a set of independent log streams and modify such log streams as desired. A simplified overview of log stream modification is illustrated by FIG. 6, in which a log stream management component 610 assigns respective transactions in a transaction set 600 to one or more log streams 640. As shown by FIG. 6, log stream management component 610 can modify log streams 640 at least in part by merging log streams 640, e.g., via a stream merge component 620, or splitting log streams 640, e.g., via a stream split component 630.

Figure 7:
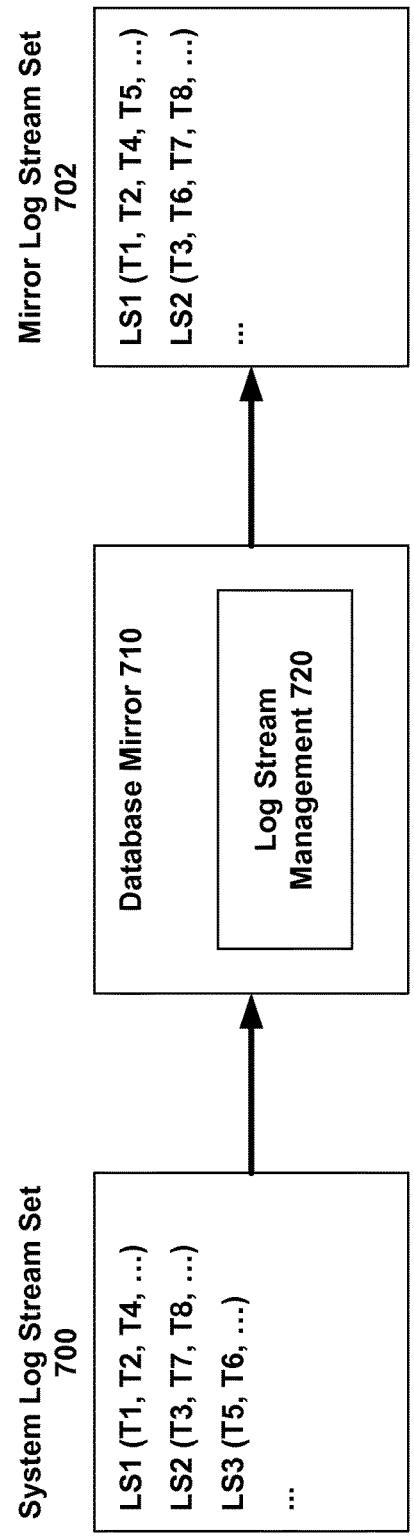
FIG. 7 is a block diagram showing a database mirror node implementing log stream management mechanisms in accordance with one or more embodiments.

In an embodiment, management of log streams as shown generally by FIG. 6 can further be used to enable a database mirror (e.g., at a secondary node, etc.) to modify log streams in order to conform with the local I/O configuration of the mirror. For example, as shown by FIG. 7, a system log stream set 700 can be passed to a database mirror 710, which can utilize a log stream management component 720 or other suitable mechanisms to modify the respective log streams in system log stream set 700. These modifications can result, for example, in a mirror log stream set 702 that conforms to the I/O device configuration of database mirror 710. While FIG. 7 provides an illustrative example of a database mirror 710 condensing log streams, it should be appreciated that database mirror 710 can utilize log stream management component 720 and/or any other suitable mechanism(s) to manage respective associated log streams in any suitable manner. These modifications can include, but are not limited to, merging log streams, splitting log streams, creating or deleting log streams, modifying one or more records contained within a log stream, or any other suitable operation(s).

Returning to FIG. 5, log stream management component 540 can facilitate varying levels of recovery parallelism as generally described herein. For example, log stream management component 540 can be configured to realize log stream pre-processing/processing parallelism by, e.g., loading and/or otherwise processing a plurality of log streams in a parallel manner. In another example, log manager component 530 can cooperate with log stream management component 540 and/or other components of database system 510 to realize index insert parallelism by, e.g., facilitating insertion of respective database rows corresponding to a plurality of log streams into an index corresponding to data store(s) 500 and/or 502 in a parallel manner.

In another embodiment, log manager component 530 further includes a checkpointing component 550, which can be configured to maintain checkpoint information for database system 510. Unlike conventional database systems that utilize physical checkpoint files, checkpointing component 550 can facilitate the use of logical checkpoints, e.g., without reference to respective locations within data store(s) 500 or 502. In an embodiment, checkpoints created by checkpointing component 550 can be at least partially inherent from log information generated by log manager component 530. For instance, in contrast to sequence information as provided in a conventional set of physical checkpoints, checkpointing component 550 can leverage timestamps provided within transaction log records in order to allow for restoration of data store(s) 500 or 502 by repeating respective logged transactions in an order implicit from their respective timestamps. In another embodiment, checkpointing component 550 can leverage multiversioning functionality of database system 510 to generate checkpoint information relating to database system 510 in parallel with other operations within database system 510. Accordingly, increased efficiency can be realized over conventional systems, in which data must be locked prior to checkpointing to prevent unexpected behavior. Various aspects of checkpointing functionality that can be performed by the embodiments herein are provided in further detail herein.

In one embodiment, checkpointing component 550 can cooperate with log manager component 530 to realize checkpoint load parallelism by, e.g., initiating checkpoint loading in parallel with log loading at log manager component 530. Various examples by which log stream pre-processing/processing parallelism, index insert parallelism, checkpoint load parallelism, and/or other suitable aspects of recovery system parallelism can be implemented are provided in further detail herein.

A recovery component 560 can be utilized by database system 510 to recover the state of database system 510 and/or one or more data stores 500 or 502 in the event of a database crash, a storage device failure, and/or any other suitable event for which recovery of some or all data associated with database system 510 is desired. In one embodiment, recovery of data associated with database system 510 can be achieved by replaying transactions recorded in a transaction log generated by log manager component 530 in an order given by the timestamps of the respective transactions. In one example, recovery in this manner can be performed with the assistance of, or independently of, checkpointing component 550.

Database system 510 can further include a disk management component 570, which is configured to manage one or more disk data stores associated with database system 510. By way of non-limiting example where database system 510 is an in-memory database system, disk management component 570 can manage the insertion, deletion, and/or modification of data items on disk in response to corresponding operations performed on said data items in memory.

In another embodiment where database system 510 is an in-memory database system, disk management component 570 can be configured to avoid writing dirty data, e.g., data corresponding to a transaction that has not yet committed, to disk. For instance, as conventional on-disk database systems are not designed to operate in memory, such systems can in some cases require one or more items of dirty data to be written to disk in the event that sufficient memory is not available at the system for full processing of the transaction(s) corresponding to the data items. In contrast, disk management component 570 can leverage the in-memory nature of a database system write data items to disk in response to confirmation of the data items via commitment of their corresponding transaction(s).

In addition, database system 510 can leverage an in-memory working environment in some cases in order to refrain from performing Write Ahead Logging, as generally described above. Thus, in contrast to some conventional database systems that are configured to log transaction information prior to commitment, database system 510 (e.g., through disk management component 570) can restrict logging of transactions until the transactions have committed. As a result, database system 510 can additionally operate without reliance on an undo log for respective transactions. Thus, in response to commitment of a transaction, undo information and/or other information relating to reversal of the transaction can be discarded.

Figure 8:
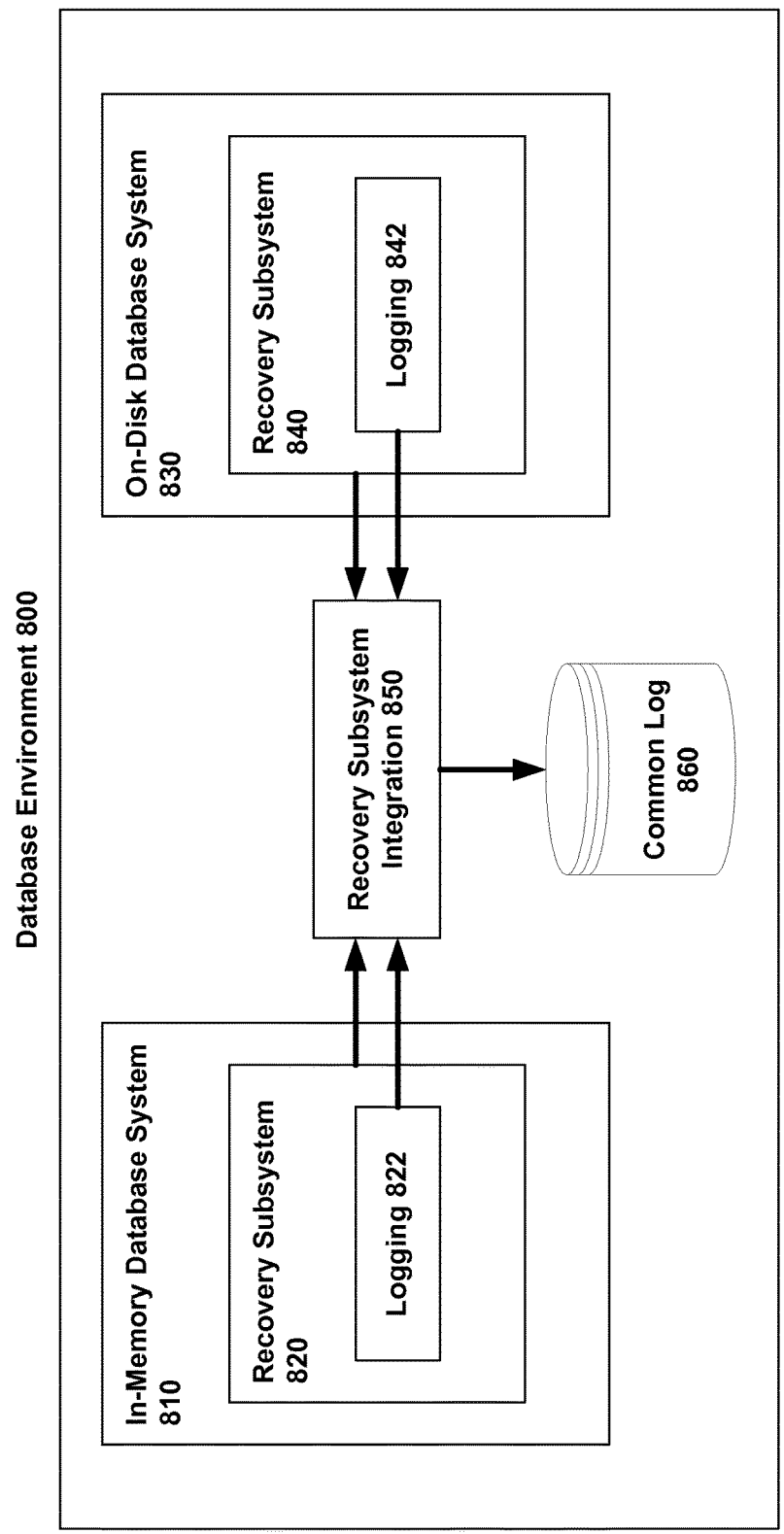
FIG. 8 is a block diagram showing exemplary functions of a database system integration mechanism in accordance with one or more embodiments.

In another embodiment, logging and recovery techniques as described herein can be utilized to facilitate database system integration. FIG. 8 shows a simplified illustrative overview of database system integration that can be performed in accordance with embodiments presented herein. As illustrated in FIG. 8, a database environment 800 can include multiple database systems, such as an in-memory database system 810 and an on-disk database system 830. In-memory database system 810 and on-disk database system 830 can each include respective recovery subsystems 820 and 840, which in turn can incorporate logging components 822 and 842 to record operations performed within the respective corresponding systems. In one specific, non-limiting example, in-memory database system 810 can perform logging and recovery in accordance with various embodiments herein, and on-disk database system 830 can correspond to a master database instance with which in-memory database system 810 interacts. While FIG. 8 illustrates database environment 800, in-memory database system 810 and on-disk database system 830 as single blocks, it should be appreciated that the functionality of such entities could be distributed among any suitable number of computing devices or other devices, each of which can be communicatively coupled via any suitable wired or wireless communication means and/or any other mechanisms.

As additionally shown in FIG. 8, a recovery subsystem integration component 850 is implemented within database environment 800. In an embodiment, recovery subsystem integration component 850 is configured to integrate respective system logs generated by logging components 822 and 842 and integrate them such that the appearance of a single, common log 860 is presented to a user of database environment 800. In one example, recovery subsystem integration component 850 can be configured to combine logs associated with in-memory database system 810 and on-disk database system 830 such that common log 860 is utilized by both systems. Alternatively, recovery subsystem integration component 850 can be configured to manage logs associated with in-memory database system 810 and on-disk database system 830 and facilitate communication between them, based on which common log 860 can be maintained as a structure that ostensibly combines the respective system logs for expedited user management of database environment 800. In an embodiment, by providing log integration in one or more of the above manners, recovery subsystem integration component 850 can function independently or in combination with one or more other components to enable respective database systems operating within database environment 800 to operate as a single database in the view of an end user.

In an embodiment, in-memory database system 810 and on-disk database system 830 can cooperate via recovery subsystem integration component 850 and/or other suitable mechanisms to optimize a two-phase commit procedure utilized in database environment 800. In one example, database environment 800 enables customers or other users of on-disk database system 830 to relegate some of their tables and/or workload to in-memory database system 810 in order to obtain improvement in overall system behavior without significant changes to their code. Thus, in order to achieve this, the cost of two-phase commit for on-disk database system 830 can be reduced when used with in-memory database system 810 as follows.

Conceptually, it can be appreciated that the cost of two-phase commit derives from the fact that the 'Prepare' phase requires at least one I/O from every participant and the 'Commit' phase requires one I/O from the master (and some deferred activity from other participants). Thus, a simplistic implementation with 2 participants (e.g., on-disk database system 830 as master and in-memory database system 810) incurs three I/Os instead of the one incurred by on-disk database system 830 alone. As a result, in some cases a user may see degradation in performance by moving a subset of their data and processing to in-memory database system 810. Therefore, one or more schemes can be used that minimize the penalty incurred by mixed-container transactions.

In order to achieve the above ends, database environment 800 can allow data pertaining to a transaction at in-memory database system 810 to reside in multiple log streams. It should be appreciated, however, that this modification would have no impact on the other embodiments described herein aside from the addition of sequencing for the transaction segments contained in respective log arenas.

In the event that splitting transactions across arenas is possible, partial transaction logs can be sent to the log manager as a mixed transaction transitions between systems or when a multi-step transaction returns to the user. These actions are substantially equivalent to keeping the transaction at in-memory database system 810 in an "almost prepared" state a substantial portion of the time. Therefore, when the 'Prepare' call of the master arrives, it may be possible that the in-memory portion of the log has already been persisted and no action needs taken at in-memory database system 810. Thus, if on-disk database system 830 additionally decides to first 'Prepare' the in-memory database engine and then prepare the master transaction, it can then bundle the 'Prepare' and 'Commit' calls in one single I/O operation, thereby achieving a level of performance similar to the single phase commit case at on-disk database system 830.

Figure 9:
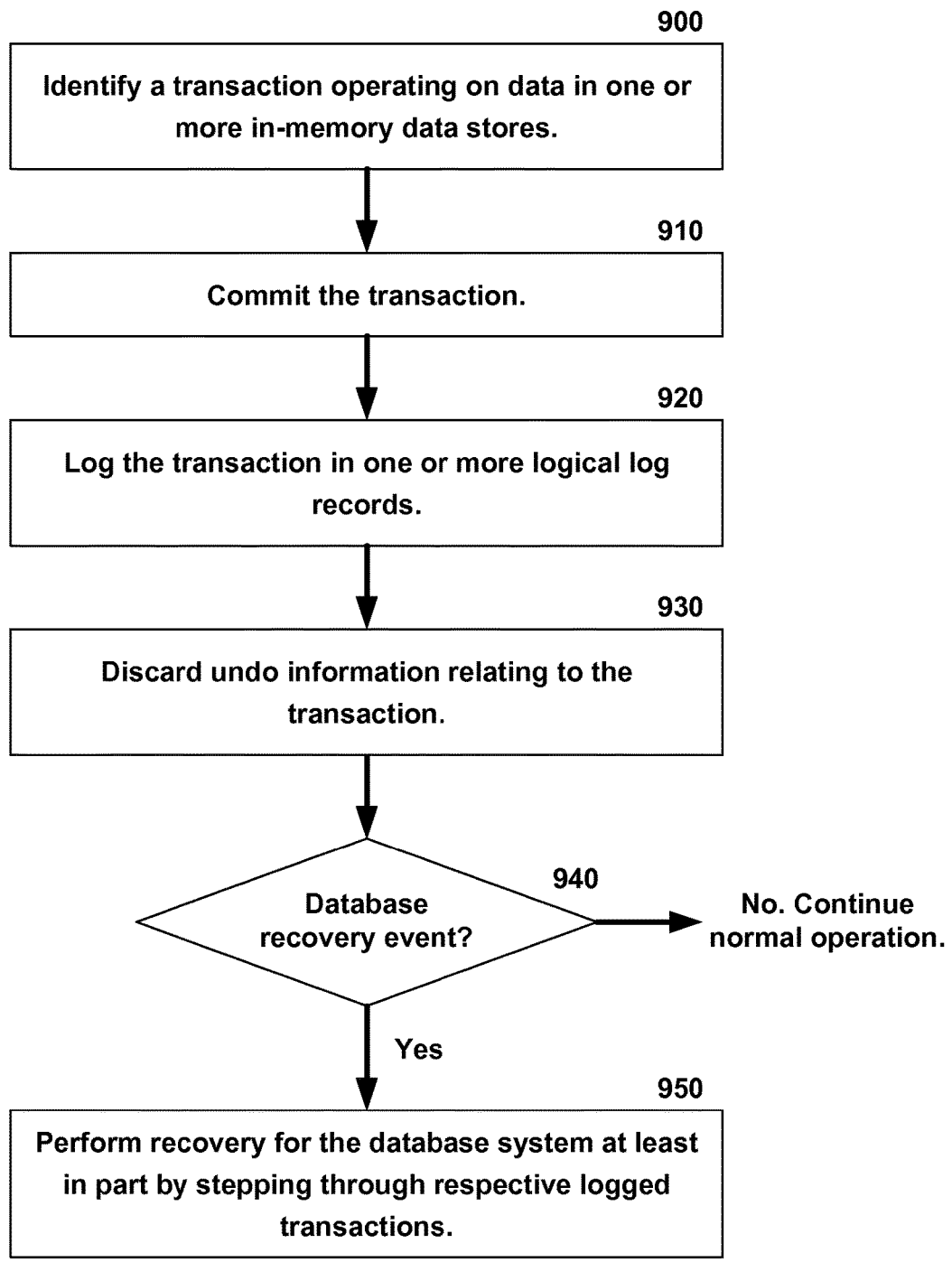
FIG. 9 is a flow diagram illustrating an exemplary non-limiting process for managing a recovery subsystem in an in-memory database system.

FIG. 9 is a flow diagram illustrating an exemplary non-limiting process for managing a recovery subsystem in an in-memory database system. At 900, a transaction is identified that operates on data in one or more in-memory data stores. The transaction is committed at 910, in response to which the transaction is logged in one or more logical log records at 920. In one non-limiting example, logging of the transaction at 920 can include writing to disk all new versions of the records modified by the transaction. At 930, undo information relating to the transaction is discarded. Subsequently, a determination is made at 940 regarding whether an event has occurred for which database recovery is desirable. If no such event has occurred, the database system continues its normal operation. Otherwise, at 950, recovery for the database system is performed at least in part by stepping through respective logged transactions (e.g., as logged at 930).

Figure 10:
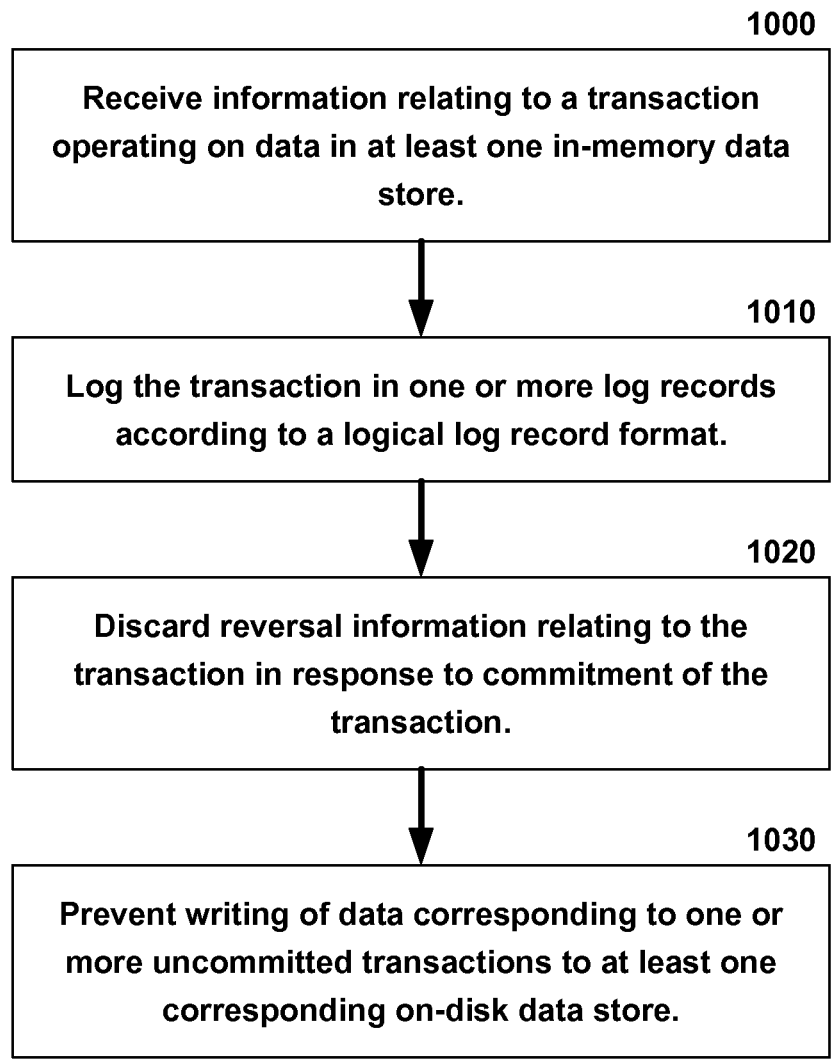
FIG. 10 is another flow diagram illustrating an exemplary non-limiting process for maintaining database recovery information with respect to a database transaction.

FIG. 10 is a flow diagram illustrating an exemplary non-limiting process for maintaining database recovery information with respect to a database transaction. At 1000, information relating to a transaction operating on data in at least one in-memory data store is received. At 1010, the transaction is logged in one or more log records according to a logical log record format. At 1020, reversal information relating to the transaction is discarded in response to commitment of the transaction. At 1030, writing of data corresponding to one or more uncommitted transactions (e.g., dirty writes) to at least one corresponding on-disk data store is prevented.

Figure 11:
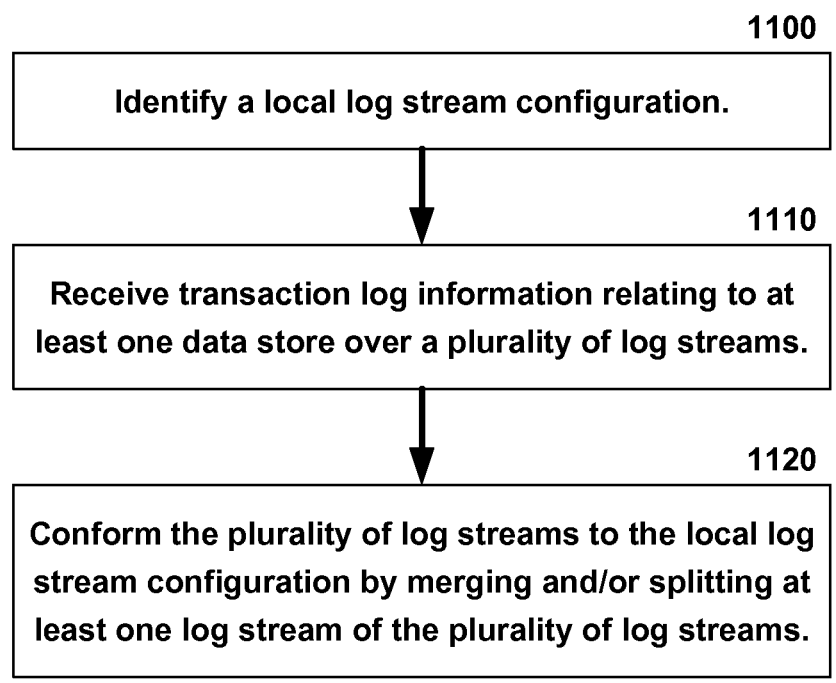
FIG. 11 is still another flow diagram illustrating an exemplary non-limiting process for maintenance of a database system at a secondary node.

FIG. 11 is a flow diagram illustrating an exemplary non-limiting process for maintenance of a database system at a secondary node. At 1100, a local log stream configuration (e.g., a log I/O configuration used by the secondary node, etc.) is identified. At 1110, transaction log information is received over a plurality of log streams that relates to at least one data store. At 1120, the secondary node conforms the plurality of log streams to the local log stream configuration by merging and/or splitting at least one log stream of the plurality of log streams.

Non-Limiting Example Checkpoint Management Procedures

Various embodiments of database recovery mechanisms have been described above. In the following description, a variety of techniques that can be utilized for creating and maintaining checkpoints that can be utilized for checkpoints (e.g., via a checkpointing component 550, as shown in FIG. 5), crash recovery and backup as described herein are provided. The below description, like the implementation-specific details above, should not be taken as limiting on the more general concepts and embodiments described elsewhere herein, and are included merely for illustrative purposes.

In an embodiment, a simple full checkpoint can be generated by, e.g., saving the entire content of the database in one large I/O to a single file at predefined intervals. Among other benefits, it can be appreciated that checkpointing in this manner provides ease of implementation as well as transactional consistency. By way of non-limiting example, this checkpoint scheme can collect and save the data that is isolated by the pseudo-script below.

```
for_each partition
    begin tran
    select * from <all_tables>
    select current_txid( )
```

-continued

```
    rollback tran
end for_each
```

For small databases, snapshot isolation schemes make queries such as that shown above both simple to implement and relatively cheap in runtime resources. The result of the query is a single file containing the entire database. As the database grows, this approach can be extended by partitioning the data query as described below.

For instance, a simple partitioned full checkpoint scheme can be implemented as a refinement of the simple checkpoint above. Instead of using one transaction to scan the entire database, a partitioned checkpoint process uses multiple smaller transactions that each isolate and harden only a subset of the checkpoint set. The partitioning can be done on a table-by-table basis; alternatively the checkpoint process can use a physical partitioning scheme (e.g., a count of hash buckets) to obtain a more even distribution of rows to checkpointing transactions.

Partitioning can assist in checkpointing by enabling parallelization of the checkpoint generation process across multiple cores. Additionally, splitting the checkpoint across multiple transactions avoids generating long-running transactions that have system-wide impact. By way of non-limiting example, a partitioned checkpoint operation can be conducted as shown in the below pseudo-script.

```
for_each partition
    begin tran
    select * from <all_tables> where rows_in_partition
    select current_txid( )
    rollback tran
end for_each
```

It should be noted, however, that unless the transactions share the same 'Start' timestamp, the checkpoint image may not be transactionally consistent. In other words, unlike the first simple checkpoint image, the image obtained through the above process may need assistance from the log records that overlap the checkpoint in order to produce a fully consistent database at recovery time. Accordingly, it can be appreciated that this scheme trades parallelism and memory utilization for recovery time and code complexity.

As another alternative, forward-only differential checkpoints can be utilized. Unlike the simple and partitioned checkpointing schemes, a differential checkpointing algorithm does not produce a full image of the in-memory database. Instead, differential checkpointing uses information saved in the system since the last checkpoint to isolate the "islands" of data that have been modified since the last checkpoint.

By saving only data that has changed, it can be appreciated that differential checkpoints provide potential for significant savings in the central processing unit (CPU) cost as well as the I/O cost associated with the checkpoint. Moreover, as described further below, a substantial portion of existing data provided within a database system can be leveraged in tracking changes between checkpoints. Thus, differential checkpoints provide a tradeoff between the foregoing benefits and costs associated with recovery and memory utilization.

As additional background to the differential checkpoint maintenance techniques described below, the following describes various aspects of database garbage collection. In one example, a database system can utilize snapshot isolation as the basis for all other isolation levels. As a result, a garbage collection component is implemented that is responsible for cleaning up old versions. Accordingly, garbage collection in such a system acts as a global clearing house for all data modifications in the system. In particular, the garbage collection component can track the amount of "garbage" associated with respective indices on a substantially granular basis (e.g., with bucket granularity). In one example, this is achieved via a garbage collection bucket information structure.

A garbage collection bucket information structure is created in response to a deleted row in a committed transaction (or an insert row in an aborted transaction) being observed by the garbage collector. The garbage collection bucket information counts the amount of garbage on a particular bucket. Once established, this count is maintained both by the garbage collector component and any regular thread that encounters garbage and cleans it up in the process of a regular scan. In one example, this forms the basis for a cooperative garbage collector.

In one example, differential checkpointing can extend the garbage collection bucket information structure such that it not only tracks the number of garbage rows in a bucket, but also contains a "checkpoint dirty" flag that indicates that the bucket tracked by a given garbage collection bucket information structure should be included in the next differential checkpoint. By way of non-limiting example, pseudo-script that can be used to generate a checkpoint image in the above manner is provided below.

```
begin tran
select * from <all_tables> where 'GcBucketInfo' is dirty
select current_txid( )
rollback tran
```

In another example, the above script can be partitioned, and the workload parallelized, in a similar manner to the simple partitioned checkpoint scheme described above.

In the above approach, each differential checkpoint is stored in a separate file, and the differential checkpoint scheme relies on the presence of a full checkpoint at some time in the past. A tradeoff of this procedure is that, because data is never updated "in place," the original full checkpoint may "decay" with the creation of new differential checkpoint files. In particular, new differential checkpoint files can in effect overwrite progressively more sections from the original checkpoint file, accelerating its degradation.

Figure 12:
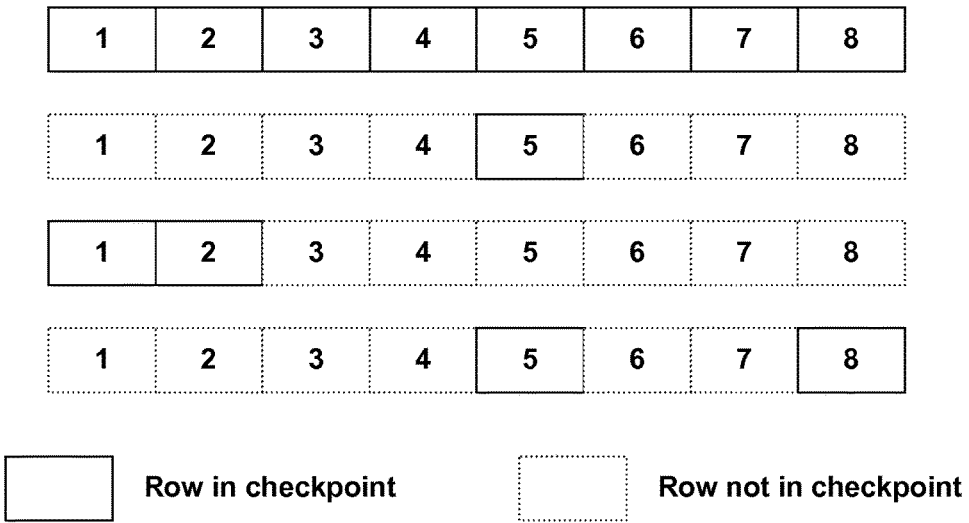
FIG. 12 is an illustrative view of an exemplary database checkpointing scheme.
Figure 12:
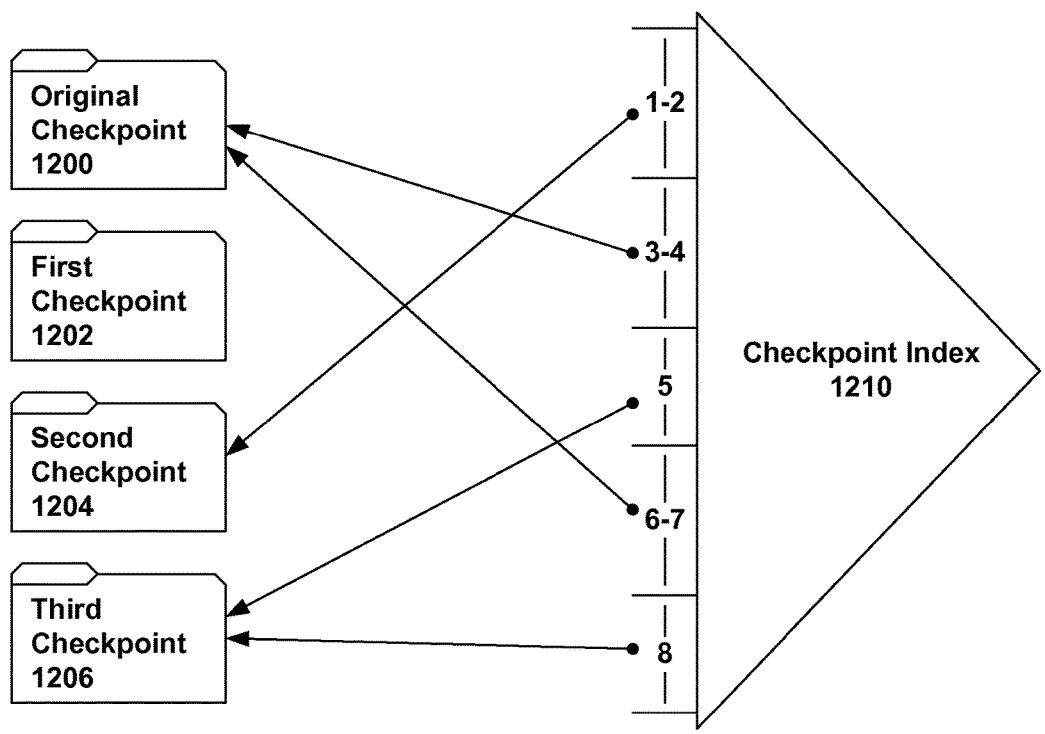

In an embodiment, a database engine can, at recovery time, ascertain which sections of which checkpoint files (e.g., both full and differential) are to be scanned and loaded into memory. To expedite this process, a "master checkpoint index" can be created that includes pointers to the most recent checkpoint fragments in their respective locations potentially across multiple files. By way of non-limiting example, the index can be structured as a BTree containing sections that, when strung together, form a full checkpoint. FIG. 12 illustrates this layout.

As shown in FIG. 12, the original checkpoint 1200 contains 8 records, and each differential checkpoint 1202, 1204, and 1206 afterward modifies (and saves) respective records of the 8 records. Without a checkpoint-wide index 1210, the content of the final checkpoint may be difficult to recreate from component parts. For example, reading the first checkpoint 1202 merely results in lost time as the entire contents of the first checkpoint 1202 are recreated in the third checkpoint 1206.

As an alternative to the differential checkpoint procedure above, a policy of "update-in-place" for checkpoint files can be utilized in place of a master checkpoint index. In one embodiment, an "update in place" hardening policy can be utilized in which the unit of granularity being saved is a set of multiple buckets. FIG. 13 illustrates this procedure with reference to an in-memory row representation 1300 and two checkpoints 1310 and 1320. In one example, this clustering of adjacent buckets can effectively form a "logical page," which can in some cases improve space management in the corresponding on-disk file (e.g., due to the ability to satisfy and/or return additions and removals from the "slack space" available on the same logical page).

In the event that a small number of updates touches multiple pages, a write may be triggered for some or all of the affected pages. In a scenario where data is organized as a hash, this can result in the creation of an "almost full" checkpoint for a substantial portion of differential checkpoint requests. Alternatively, if the persisted data is organized in an ordered index (such as a skip list) rather than a hash index, the changes that resulted in random page writes could in some cases be clustered by virtue of their key proximity.

As another exemplary checkpointing scheme, a virtual memory (VM) replica checkpoint design can be utilized. Such a design can be utilized, for example, in a system exhibiting close integration between memory management and checkpointing. In one example, a scenario is considered in which row data comes from an incremental allocator style memory object. In the event that a database system used versioning, this allocation style can closely align with various aspects of the engine already in place.

Figure 14:
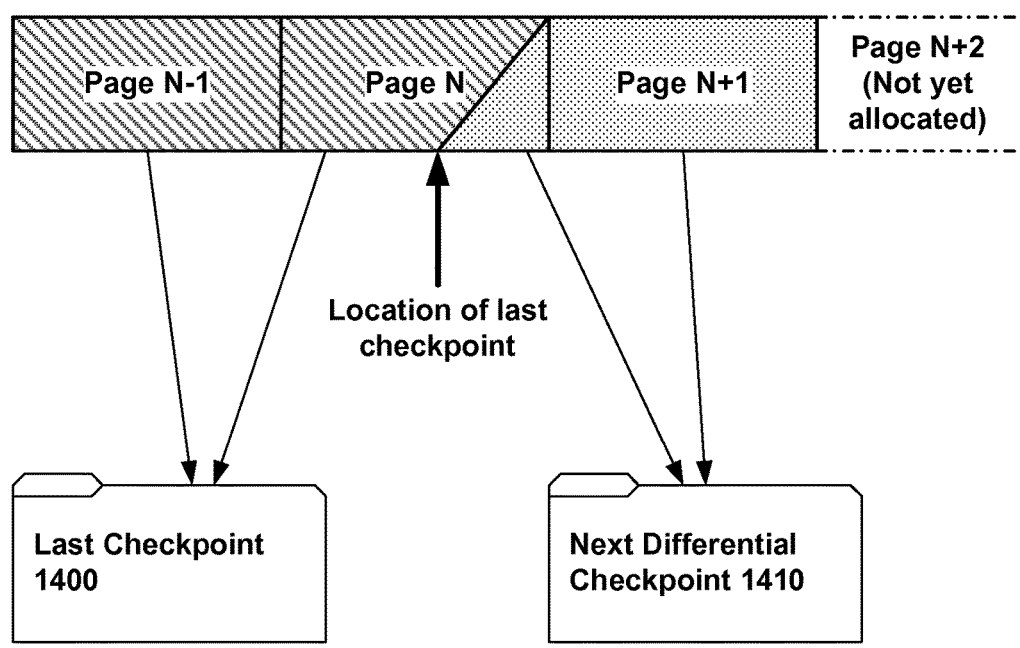
FIG. 14 is an illustrative view of another exemplary differential checkpointing technique.

In an embodiment, VM replica checkpointing can be aided by an incremental allocator due to the fact that in such a checkpointing scheme a checkpoint simply specifies the pages that have been allocated since the previous checkpoint. FIG. 14 illustrates this concept with reference to a differential checkpoint 1410 that occurs after a previous checkpoint 1400.

With further regard to the database recovery techniques provided herein, the mechanics of recovery processing can be implemented as follows. From a pure latency perspective, it can be appreciated that recovery in a memory-based system is at a disadvantage when compared to a non-memory based system. This is because in a memory-based system a database is not recovered until its entire contents are in memory, whereas a traditional database is considered recovered after redo and undo, by the end of which only a small number of data pages need to have been loaded in the buffer pool. In view of the foregoing, mechanisms can be implemented in an in-memory system to achieve recovery level parallelism to the extent possible.

As described herein, an in-memory database recovery system can support multiple log streams, which is a consequence of the logical log format utilized by the recovery system. Accordingly, a scheme for recovery in such a system can follow the exemplary sequence below.

(1) Scan the log for analysis and find the location of the last checkpoint.

(2) Reload the checkpoint (from one or multiple files).

(3) Run the redo phase, which rescans the relevant tail of the multiple log streams.

(4) Merge the log stream tails into one single sequential, 'unified' log history.

(5) Apply the log records found in this unified log history to the previously loaded checkpoint image.

In further embodiments, the above sequence can be utilized in connection with various other mechanisms to provide additional opportunities for parallelism. These opportunities are described in further detail below.

In a first example, load scan pre-processing parallelism can be realized as follows. It is noted that multiple log streams can be read and pre-processed in parallel. Since transactions have a unique sequential ID, it is possible to create the unified history in parallel (and, in some cases, in a manner amenable to a lock-free implementation) by, e.g., having each reader thread populate its designated slot on a virtual unified history timeline. In this timeline, the first transaction (e.g., a transaction with ID 100), together with its corresponding log records, is loaded at slot zero. Additionally, a transaction 101 can be loaded at slot 1, a transaction 113 at slot 13, and so on. In an example, this timeline is filled asynchronously, such that at any point in time the slot following (or preceding) a given slot might not yet be filled. However, it can nonetheless be appreciated that by the end of the scan of all log streams, the timeline will be fully filled (e.g., every slot for transaction ID will be occupied).

In addition to parallel loading, the records can be inserted into the actual in-memory indices. This can be done, e.g., by a single thread that specializes in this task alone (referred to herein as an insert thread). By way of example, the load thread that populates the high watermark of the compact unified history can take on the role of the insert thread rather than a separate, dedicated thread. For instance, in the case of a unified history that appears as that below:

Transaction Ids: [100, 101, 102, 103,], 106, 108

The above sequence shows a history with nine slots, out of which the first four have already been loaded in the in-memory tables, {104, 105 and 107} are still missing and 108 is the last transaction loaded from the log streams. Given this layout, the thread that loads transaction 104 is also responsible for pushing the content of 104 in the corresponding tables, since 104 is the high watermark for the entire compact (or "applied") transaction history. Put another way, the thread that fills the "oldest" empty slot (e.g., older in the sense that there are no other empty slots whose transaction IDs are smaller than this one) becomes the insert thread. In one example, the insert thread retains the "inserter" role and moves up the transaction timeline inserting filled transactions until it finds another empty slot, at which point the thread reverts to a standard loader thread.

It can be appreciated that in the above scheme a single thread can insert rows while multiple threads can load rows. However, this limitation is not significantly restricting as the act of loading rows can offload much of the work of inserting the rows in the tables. For instance, the loader threads can allocate memory for the new rows and compute insert locations for the new rows (e.g., for hash indices). Accordingly, all that is left for the insert row is to move the row to its pre-computed place.

It can further be appreciated that in the above scheme row insertion does not need to use a full transaction. While insertion needs to find and apply records in the correct order, insertion does not need to do any validation, post processing or logging (although garbage collection may still need to be performed).

In a second example, insert parallelism can be realized as follows. The load scan pre-processing parallelism scheme above illustrated how multiple log streams loading can execute in parallel. In the above scheme, it can be appreciated that the only serialization point is the "insert" thread.

However, it can additionally be appreciated that there are no properties of the insert thread that would require it to be unique in the system. Accordingly, assuming loader threads are also allowed to insert rows, a scheme can be derived that results in a consistent database after all rows are inserted.

In an embodiment, assuming that both the log and the checkpoint contain a full image of the rows (including timestamps), a timeline can be established on a row-by-row basis rather than at transaction-wide scope. Since multiple insert threads are used, it can be appreciated that rows can be processed and ready for insertion into the index out of order. This can be handled in a variety of manners; for example, various techniques can be employed based on leaving sufficient information in the index to indicate to the subsequent sequential insert that information regarding a future insert is available somewhere. This can be achieved by, e.g., ghost records and/or any type of deferred work item indicator or other suitable indicator.

In a third example, checkpoint parallelism can additionally be realized. For instance, checkpoint loading can be started in parallel with loading of the log. This can enhance performance by placing the system in a position to start both checkpoint loading (itself parallel given multiple checkpoint streams) and log loading at the end of analysis. Put another way, in the previous schemes it can be appreciated that redo is delayed until the checkpoint is loaded to memory. However, if insert parallelism is applied to both log and checkpoint loading, then all data streams can be processed in parallel such that processing is completed at the same time as the redo log scan.

In an embodiment, checkpoint parallelism can be achieved using mechanisms similar to those used in achieving insert parallelism. In addition, to support checkpoint parallelism, sufficient information can be saved (e.g., in both the log and checkpoint) to be able to fully reconstruct a row, including header timestamps. In one example, the existence of a primary key allows relaxation of the "full row" requirement, as it provides a way to uniquely identify a row without having its full content.

Exemplary Networked and Distributed Environments

One of ordinary skill in the art can appreciate that the various embodiments of the database recovery systems and methods described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the recovery mechanisms as described for various embodiments of the subject disclosure.

Figure 15:
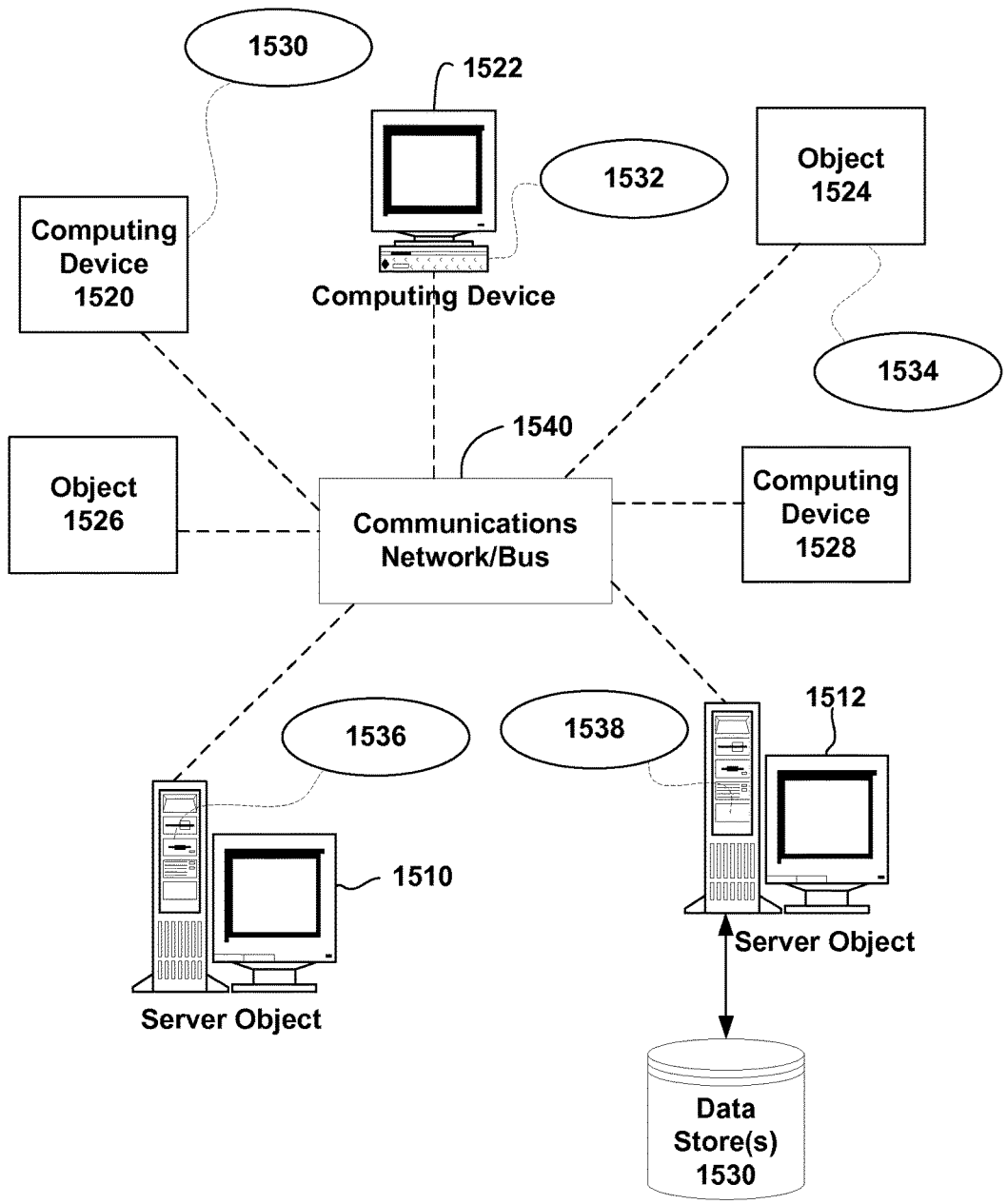
FIG. 15 is a block diagram representing exemplary non-limiting networked environments in which various embodiments described herein can be implemented.

FIG. 15 provides a schematic diagram of an exemplary networked or distributed computing environment. The distributed computing environment comprises computing objects 1510, 1512, etc. and computing objects or devices 1520, 1522, 1524, 1526, 1528, etc., which may include programs, methods, data stores, programmable logic, etc., as represented by applications 1530, 1532, 1534, 1536, 1538. It can be appreciated that computing objects 1510, 1512, etc. and computing objects or devices 1520, 1522, 1524, 1526, 1528, etc. may comprise different devices, such as PDAs, audio/video devices, mobile phones, MP3 players, personal computers, laptops, etc.

Each computing object 1510, 1512, etc. and computing objects or devices 1520, 1522, 1524, 1526, 1528, etc. can communicate with one or more other computing objects 1510, 1512, etc. and computing objects or devices 1520, 1522, 1524, 1526, 1528, etc. by way of the communications network 1540, either directly or indirectly. Even though illustrated as a single element in FIG. 15, communications network 1540 may comprise other computing objects and computing devices that provide services to the system of FIG. 15, and/or may represent multiple interconnected networks, which are not shown. Each computing object 1510, 1512, etc. or computing object or device 1520, 1522, 1524, 1526, 1528, etc. can also contain an application, such as applications 1530, 1532, 1534, 1536, 1538, that might make use of an API, or other object, software, firmware and/or hardware, suitable for communication with or implementation of various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the database recovery systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 15, as a non-limiting example, computing objects or devices 1520, 1522, 1524, 1526, 1528, etc. can be thought of as clients and computing objects 1510, 1512, etc. can be thought of as servers where computing objects 1510, 1512, etc., acting as servers provide data services, such as receiving data from client computing objects or devices 1520, 1522, 1524, 1526, 1528, etc., storing of data, processing of data, transmitting data to client computing objects or devices 1520, 1522, 1524, 1526, 1528, etc., although any computer can be considered a client, a server, or both, depending on the circumstances. Any of these computing devices may be processing data, or requesting transaction services or tasks that may implicate the recovery techniques as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1540 or bus is the Internet, for example, the computing objects 1510, 1512, etc. can be Web servers with which other computing objects or devices 1520, 1522, 1524, 1526, 1528, etc. communicate via any of a number of known protocols, such as the hypertext transfer protocol (HTTP). Computing objects 1510, 1512, etc. acting as servers may also serve as clients, e.g., computing objects or devices 1520, 1522, 1524, 1526, 1528, etc., as may be characteristic of a distributed computing environment.

Exemplary Computing Device

As mentioned, advantageously, the techniques described herein can be applied to any device where it is desirable to perform database recovery. It should be understood, therefore, that handheld, portable and other computing devices and computing objects of all kinds are contemplated for use in connection with the various embodiments, i.e., anywhere that a device may wish to read or write transactions from or to a data store. Accordingly, the below general purpose remote computer described below in FIG. 18 is but one example of a computing device. Additionally, a database server can include one or more aspects of the below general purpose computer or other database management server components.

Although not required, embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol should be considered limiting.

Figure 16:
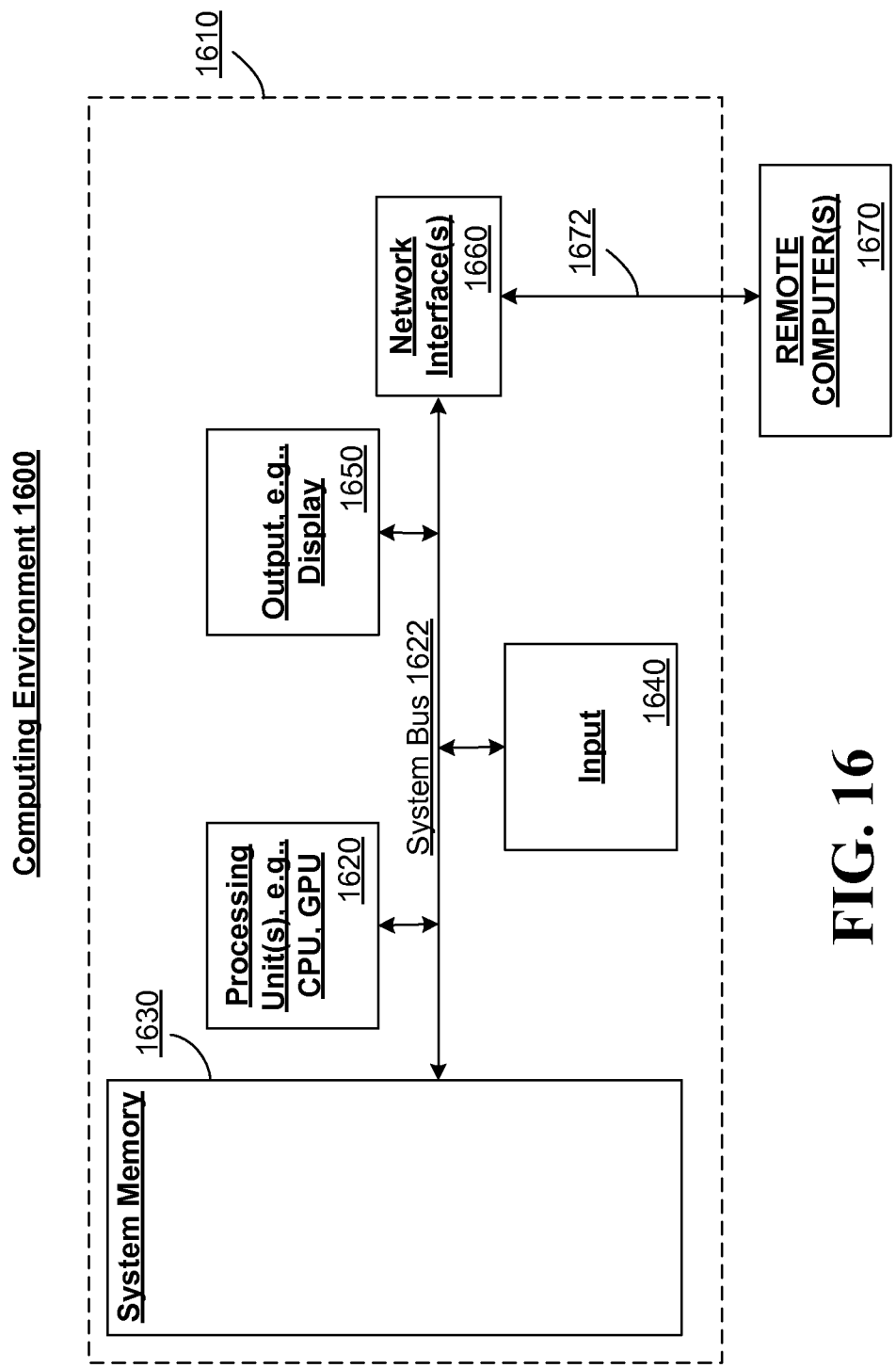
FIG. 16 is a block diagram representing an exemplary non-limiting computing system or operating environment in which one or more aspects of various embodiments described herein can be implemented.

FIG. 16 thus illustrates an example of a suitable computing system environment 1600 in which one or aspects of the embodiments described herein can be implemented, although as made clear above, the computing system environment 1600 is only one example of a suitable computing environment and is not intended to suggest any limitation as to scope of use or functionality. Neither should the computing system environment 1600 be interpreted as having any dependency or requirement relating to any one or combination of components illustrated in the exemplary computing system environment 1600.

With reference to FIG. 16, an exemplary remote device for implementing one or more embodiments includes a general purpose computing device in the form of a computer 1610. Components of computer 1610 may include, but are not limited to, a processing unit 1620, a system memory 1630, and a system bus 1622 that couples various system components including the system memory to the processing unit 1620.

Computer 1610 typically includes a variety of computer readable media and can be any available media that can be accessed by computer 1610. The system memory 1630 may include computer storage media in the form of volatile and/or nonvolatile memory such as read only memory (ROM) and/or random access memory (RAM). By way of example, and not limitation, system memory 1630 may also include an operating system, application programs, other program modules, and program data.

A user can enter commands and information into the computer 1610 through input devices 1640. A monitor or other type of display device is also connected to the system bus 1622 via an interface, such as output interface 1650. In addition to a monitor, computers can also include other peripheral output devices such as speakers and a printer, which may be connected through output interface 1650.

The computer 1610 may operate in a networked or distributed environment using logical connections to one or more other remote computers, such as remote computer 1670. The remote computer 1670 may be a personal computer, a server, a router, a network PC, a peer device or other common network node, or any other remote media consumption or transmission device, and may include any or all of the elements described above relative to the computer 1610. The logical connections depicted in FIG. 16 include a network 1672, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to facilitate recoverability of a database system.

Also, there are multiple ways to implement the same or similar functionality, e.g., an appropriate API, tool kit, driver code, operating system, control, standalone or downloadable software object, etc. which enables applications and services to take advantage of the database recovery techniques. Thus, embodiments herein are contemplated from the standpoint of an API (or other software object), as well as from a software or hardware object that implements one or more aspects of the mechanisms described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention should not be limited to any single embodiment, but rather should be construed in breadth, spirit and scope in accordance with the appended claims.

What is claimed is:

1. A database management system, comprising:
   a processor;
   a log manager component, at least partially implemented by the processor, configured to generate one or more log records in a logical log record format relating to a transaction operating on data in at least one data store, the log manager component being further configured to record a begin time of the transaction and an end time of the transaction in each of the one or more log records, information relating to reversal of the transaction being discarded in response to commitment of the transaction; and
   a recovery component configured to reconstruct an operating state of the at least one data store at least in part by applying transactions recorded via respective log records in an order determined based on begin times and end times of the transactions as recorded in their respective log records.

2. The system according to claim 1, further comprising:
   at least one persistent data store configured to store information corresponding to respective transactions; and
   a component configured to prevent writing of data corresponding to one or more uncommitted transactions to the at least one persistent data store.

3. The system according to claim 1, wherein the log manager component is further configured to record a plurality of transactions operating on data in the at least one data store in the one or more log records.

4. The system according to claim 1, wherein the log manager component includes a log stream management component configured to maintain one or more log streams that are associated with respective log records.

5. The system according to claim 4, wherein the log stream management component is further configured to manage reorganization of the one or more log streams at least in part by merging at least one log stream of the one or more log streams or splitting at least one log stream of the one or more log streams.

6. The system according to claim 4, wherein the log stream management component is further configured to load a plurality of log streams in a parallel manner.

7. The system according to claim 6, wherein the log manager component is further configured to facilitate insertion of respective database rows corresponding to the plurality of log streams into an index corresponding to the at least one data store in a parallel manner.

8. The system according to claim 1, further comprising:
   a recovery subsystem integration component configured to integrate respective transaction log records of the log manager component with respective log records of at least one disparate database system, thereby creating an appearance of a common log that includes the transaction log records of the log manager component and the transaction log records of the at least one disparate database system.

9. The system according to claim 1, wherein the log manager component comprises:
   a checkpointing component configured to generate at least one checkpoint indicative of a state of the at least one data store without reference to respective physical locations in the at least one data store.

10. The system according to claim 9, wherein the checkpointing component is further configured to generate a set of partitioned checkpoints respectively indicative of the state of respective designated portions of the at least one data store.

11. The system according to claim 9, wherein the checkpointing component is further configured to generate at least one differential checkpoint indicative of the state of respective data in the at least one data store that has been modified since a previous checkpoint.

12. The system according to claim 9, wherein the checkpointing component is further configured to initiate checkpoint loading in parallel with loading of a log via the log manager component.

13. The system according to claim 1, further comprising:
a transaction processing component configured to commit the transaction via a physical commit in which recovery information corresponding to the transaction is persistently recorded, a logical commit in which changes to data in the at least one data store caused by the transaction are visible to other transactions within the at least one data store, and a visible commit in which a result of the transaction is made available to entities outside the at least one data store.

14. A method for maintaining a database recovery system, comprising:
receiving information relating to a transaction operating on data in at least one in-memory data store;
logging the transaction in one or more log records according to a logical log record format;
recording a begin time of the transaction and an end time of the transaction in each of the one or more log records;
discarding reversal information relating to the transaction in response to commitment of the transaction;
preventing writing of data corresponding to one or more uncommitted transactions to at least one corresponding persistent data store; and
reconstructing an operating state of the at least one in-memory data store at least in part by applying transactions recorded via respective log records in an order determined based on begin times and end times of the transactions as recorded in their respective log records.

15. The method of claim 14, further comprising:
maintaining a plurality of log streams;
wherein the logging includes logging the transaction using a log stream selected from the plurality of log streams.

16. The method of claim 15, wherein the maintaining includes assigning respective input/output devices to the respective log streams of the plurality of log streams.

17. The method of claim 14, further comprising:
generating at least one checkpoint relating to a state of the at least one in-memory data store without reference to respective physical locations in the at least one in-memory data store.

18. A method for maintaining a database recovery system, comprising:
identifying a device configuration for a first data store that is configured to receive a local log stream in accordance with the device configuration;
receiving transaction log information relating to a second data store over a plurality of log streams; and
conforming the plurality of log streams to the device configuration for the first data store by at least one of merging at least one log stream of the plurality of log streams or splitting at least one log stream of the plurality of log streams, the first data store containing a mirrored version of data stored in the second data store.

19. The method of claim 18, further comprising:
identifying a series of transactions recorded within the transaction log information; and
reconstructing an operating state of the second data store to which the transaction log information relates at least in part by performing the series of transactions on the first data store.

20. The method of claim 14, further comprising:
generating a set of partitioned checkpoints relating to states of respective designated portions of the at least one in-memory data store without reference to respective physical locations in the at least one in-memory data store.

* * * * *